US012061993B2

(12) United States Patent
Kagawa et al.

(10) Patent No.: US 12,061,993 B2
(45) Date of Patent: Aug. 13, 2024

(54) SERVICE PROVIDING SYSTEM, BUSINESS ANALYSIS SUPPORT SYSTEM, AND METHOD

(71) Applicants: KABUSHIKI KAISHA TOSHIBA, Tokyo (JP); Toshiba Digital Solutions Corporation, Kawasaki (JP)

(72) Inventors: Koichi Kagawa, Niiza (JP); Yoshikata Tobita, Nishitokyo (JP); Toshio Okamoto, Tokyo (JP); Masaru Suzuki, Kawasaki (JP); Nahoko Oshita, Koganei (JP); Saori Nitta, Fuchu (JP); Kazuyoshi Nishi, Tokyo (JP); Shinichirou Amanashi, Tokyo (JP); Toshiyuki Kano, Kawasaki (JP); Takashi Tanaka, Ageo (JP)

(73) Assignees: KABUSHIKI KAISHA TOSHIBA, Tokyo (JP); TOSHIBA DIGITAL SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 18/350,170

(22) Filed: Jul. 11, 2023

(65) Prior Publication Data
US 2023/0351222 A1 Nov. 2, 2023

Related U.S. Application Data

(60) Division of application No. 16/840,781, filed on Apr. 6, 2020, now abandoned, which is a continuation of
(Continued)

(30) Foreign Application Priority Data

Oct. 6, 2017 (JP) .................................. 2017-196391

(51) Int. Cl.
G06F 7/00 (2006.01)
G06F 16/901 (2019.01)
(Continued)

(52) U.S. Cl.
CPC ........... G06N 5/025 (2013.01); G06F 16/901 (2019.01); G06F 16/908 (2019.01); G06N 3/08 (2013.01); G06N 20/00 (2019.01)

(58) Field of Classification Search
CPC ..... G06F 16/901; G06F 16/908; G06N 20/00; G06N 5/025; G06N 3/08
(Continued)

(56) References Cited

U.S. PATENT DOCUMENTS 9,043,360 B2 * 5/2015 Fang ...................... G06N 5/02
707/776
11,308,157 B1 * 4/2022 Rackley, III ....... G06Q 30/0251
2018/0077088 A1 3/2018 Cabrera-Cordon et al.

FOREIGN PATENT DOCUMENTS

JP H02123402 A 5/1990
JP H0922360 A 1/1997
(Continued)

OTHER PUBLICATIONS

International Search Report issued on Dec. 18, 2018, in corresponding International Application No. PCT/JP2018/037129 filed Oct. 4, 2018, 2 pages.

Primary Examiner — Md I Uddin
(74) Attorney, Agent, or Firm — Maier & Maier, PLLC

(57) ABSTRACT

Disclosed is a service providing system capable of providing an information processing function effective for a variety of system constructions as a service. The service providing system of the present embodiment realizes an information retrieval function, a knowledge base construction function, and a knowledge presentation function. The information
(Continued)

retrieval function retrieves information on an analysis target and information indicating a condition of the analysis target; the knowledge base construction function constructs a knowledge database for acquiring knowledge corresponding to the condition of the analysis target based on the information retrieved by the information retrieval function. The knowledge presentation function presents knowledge corresponding to the condition of the analysis target from the knowledge database.

5 Claims, 21 Drawing Sheets

Related U.S. Application Data application No. PCT/JP2018/037129, filed on Oct. 4, 2018.

(51) Int. Cl.
*G06F 16/908* (2019.01)
*G06N 3/08* (2023.01)
*G06N 5/025* (2023.01)
*G06N 20/00* (2019.01)

(58) Field of Classification Search
USPC ........ 706/11, 45, 46, 47; 707/765, 767, 769, 707/776
See application file for complete search history.

(56) References Cited

FOREIGN PATENT DOCUMENTS

| | | |
|---|---|---|
| JP | 2003058242 A | 2/2003 |
| JP | 2005250770 A | 9/2005 |
| JP | 5285575 B2 | 9/2013 |
| JP | 2016206736 A | 12/2016 |
| JP | 2017091573 A | 5/2017 |

* cited by examiner

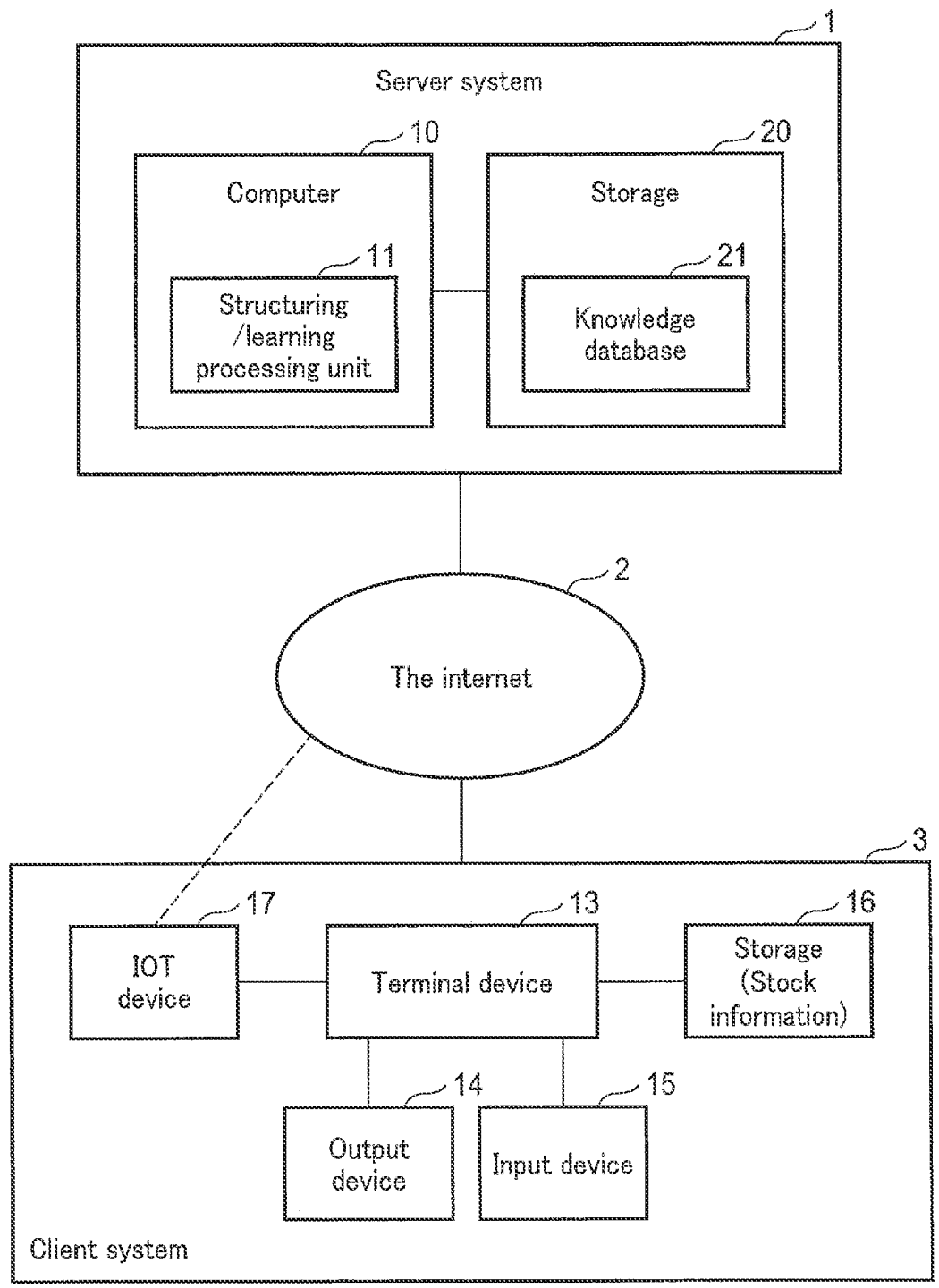
F I G. 1

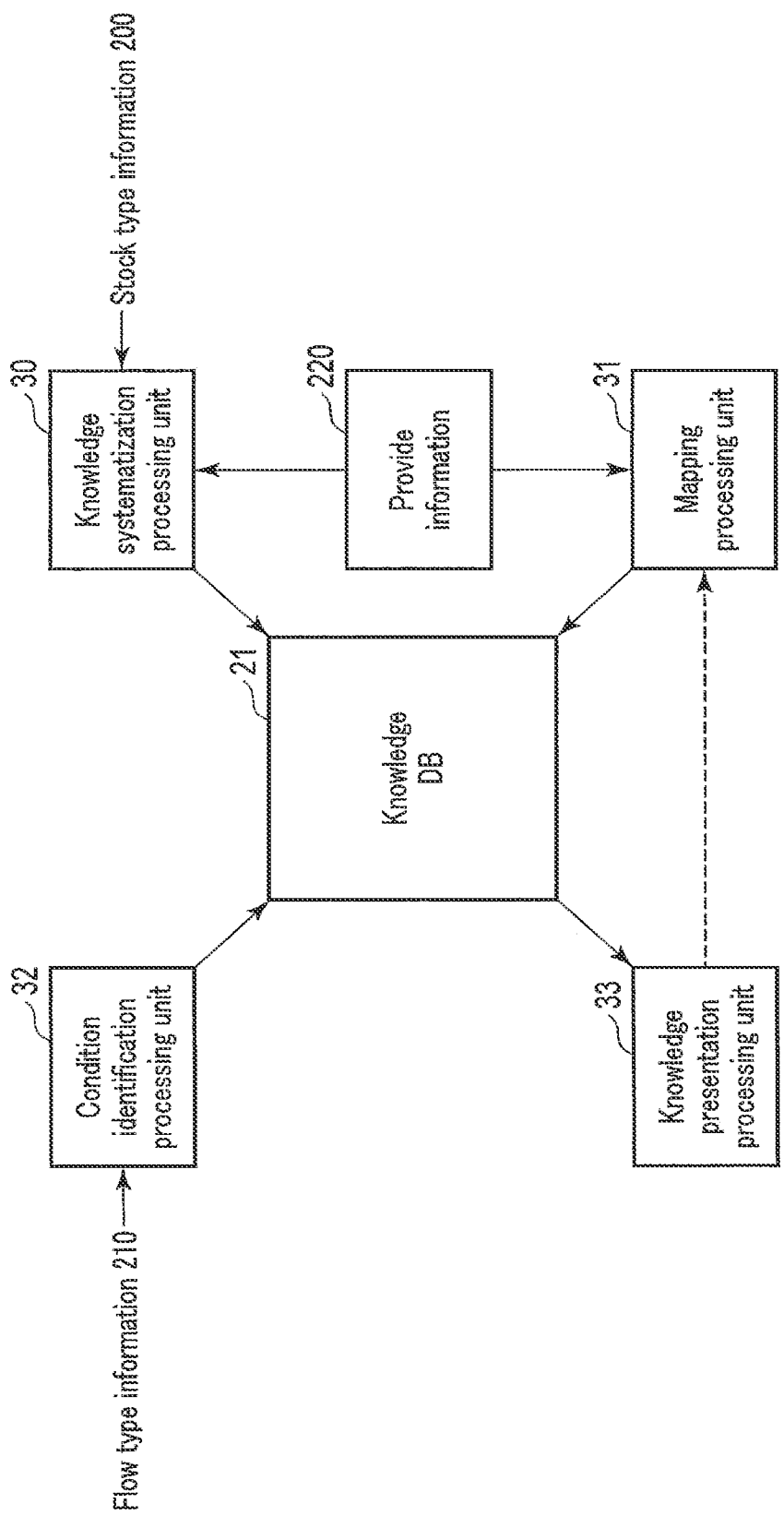
F I G. 2

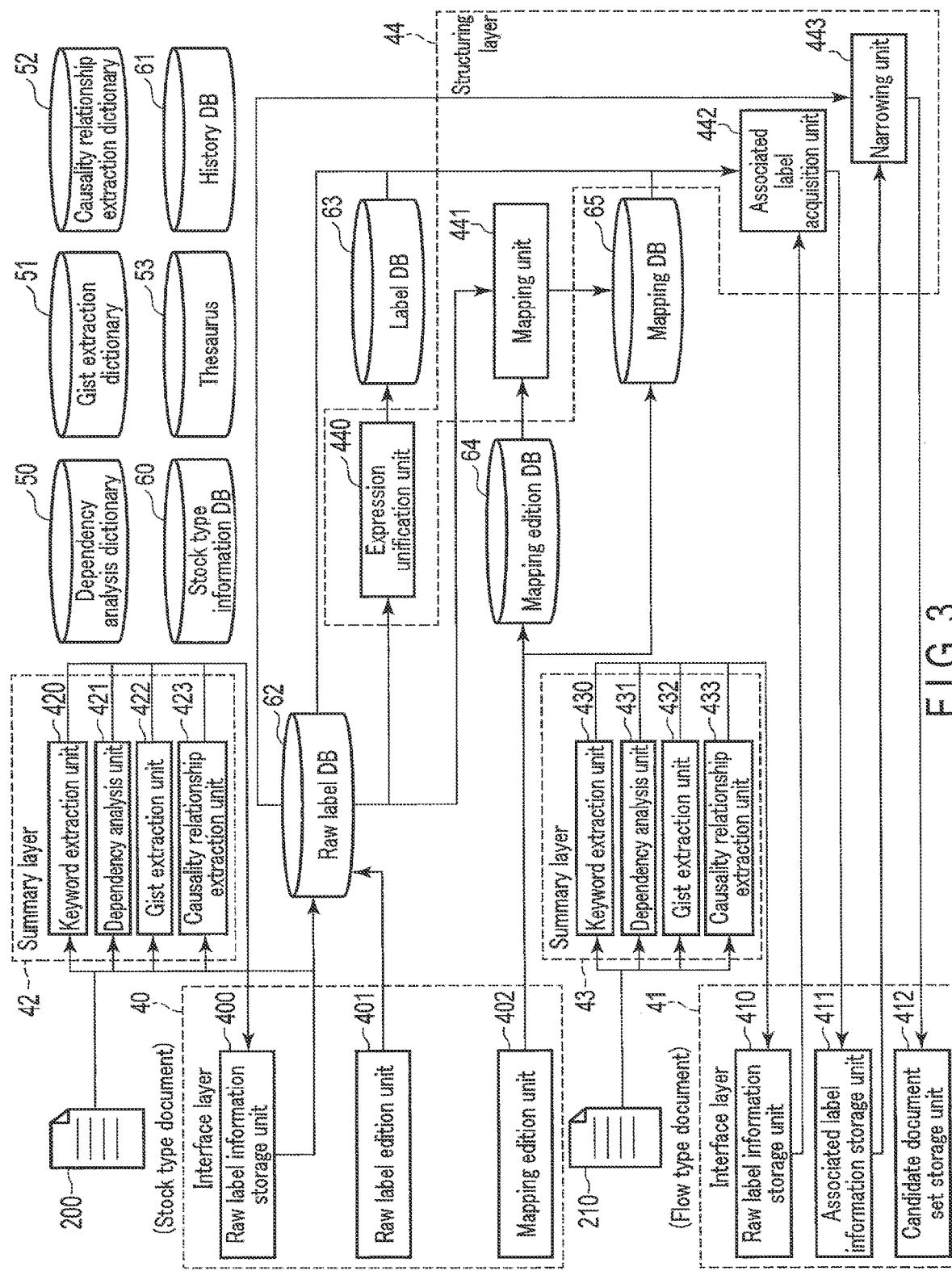
F I G. 3

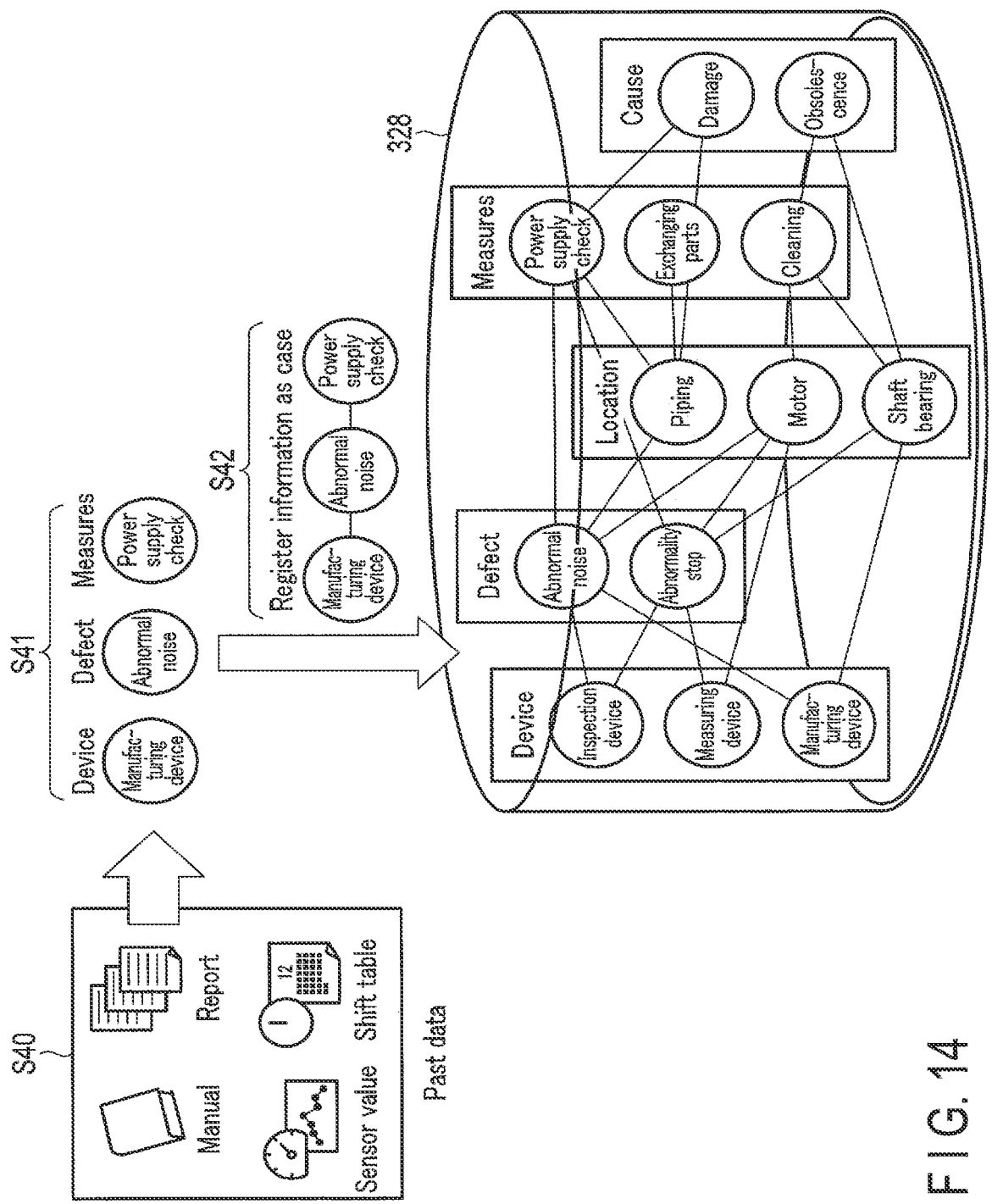
F I G. 14

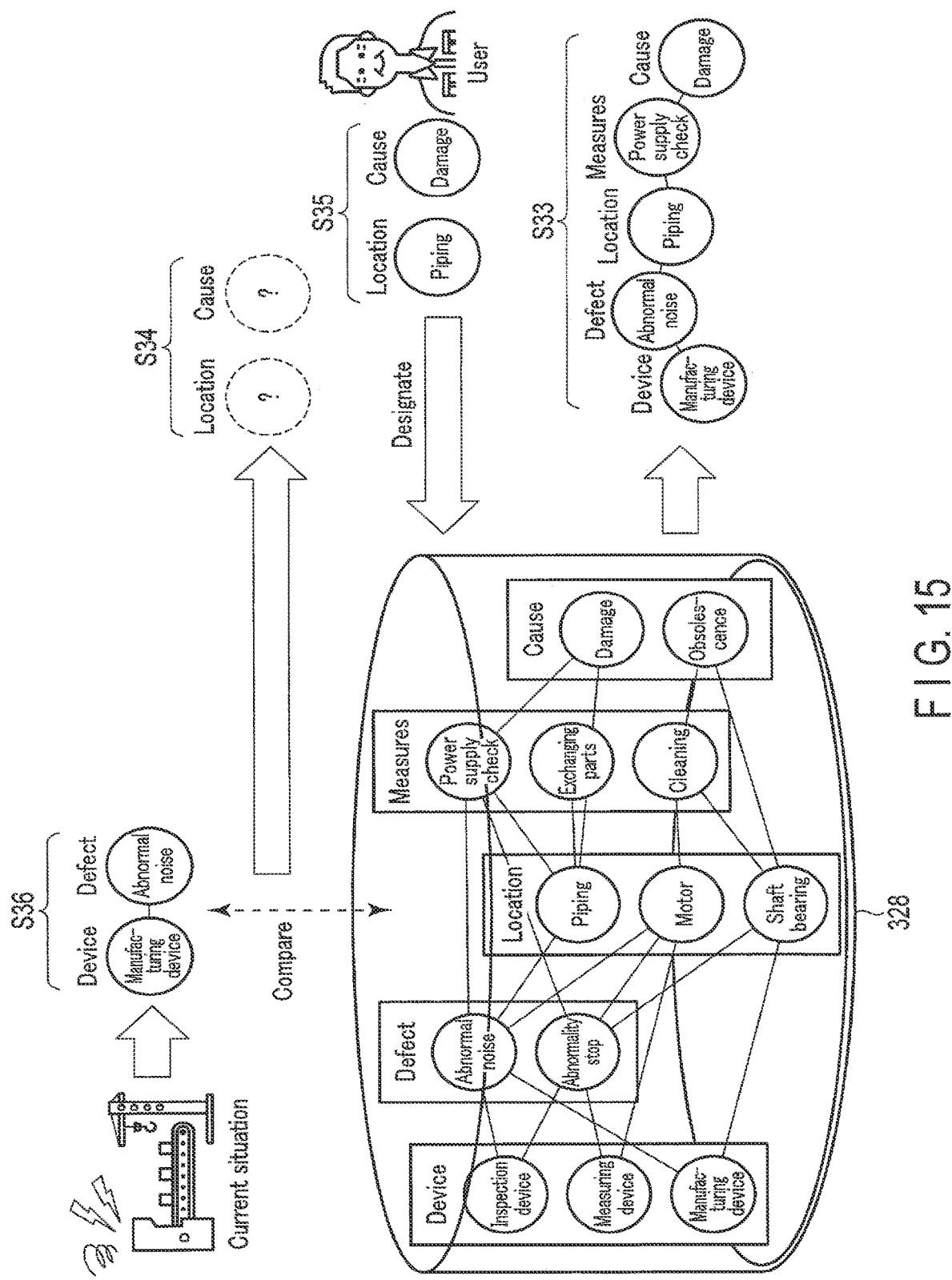
F I G. 15

Stock type information table

| Content ID | Registration No. | Start date of recall | Name of manufacturer | Defective device | No. of recall targets | Start of production | End of production | Situation | Countermeasure against failure | ... |
|---|---|---|---|---|---|---|---|---|---|---|
| 1 | 100 | April 15, 2003 | A company | Interconnection | 1370 | November 7, 2001 | September 7, 2002 | ... in power engine room ... | Protective rubber-made ... | ... |
| 2 | 151 | May 18, 2003 | T company | Distributor | 53307 | February 20, 2000 | March 20, 2000 | ... rear side of vehicle ... | Protective plate ... for ... | ... |
| ... | ... | ... | ... | ... | ... | ... | ... | ... | ... | ... |

F I G. 18

Raw label detection table

| Raw label detection ID | Content ID | ... | Raw label ID | Detection group ID |
|---|---|---|---|---|
| 1 | 1 | ... | 1 | 1 |
| 2 | 1 | ... | 2 | 1 |
| 3 | 1 | ... | 3 | 2 |
| 4 | 1 | ... | 4 | 2 |
| ⋮ | ⋮ | ⋮ | ⋮ | ⋮ |

F I G. 19

Raw label table

| Raw label ID | Raw label (Character string) | Label ID | ... |
|---|---|---|---|
| 1 | A company | 1 | ... |
| 2 | Interconnection | 2 | ... |
| 3 | Lamplight | 3 | ... |
| 4 | Resin-made sheet ... | 4 | ... |
| 5 | Disabled from operating | 5 | ... |
| ⋮ | ⋮ | ⋮ | ⋮ |

F I G. 20

Label table

| Label ID | KEY ID | Label (Character string) |
|---|---|---|
| 1 | 1 | A company |
| 2 | 2 | Interconnection |
| 3 | 3 | Lamplight |
| 4 | 4 | Incomplete attachment of seat |
| 5 | 5 | Impossible to operate |
| ⋮ | ⋮ | ⋮ |

F I G. 21

Key table

| KEY ID | KEY (Character string) |
|---|---|
| 1 | Name of manufacturer |
| 2 | Defective device |
| 3 | Location |
| 4 | Cause |
| 5 | Result |

F I G. 22

Mapping table

| Mapping ID | Label ID | Correlated label ID | Correlation strength |
|---|---|---|---|
| 1 | 1 | 2 | 1 |
| 2 | 1 | 3 | 1 |
| 3 | 1 | 4 | 1 |
| 4 | 1 | 5 | 3 |
| 5 | 1 | 6 | 2 |
| ⋮ | ⋮ | ⋮ | ⋮ |

F I G. 23

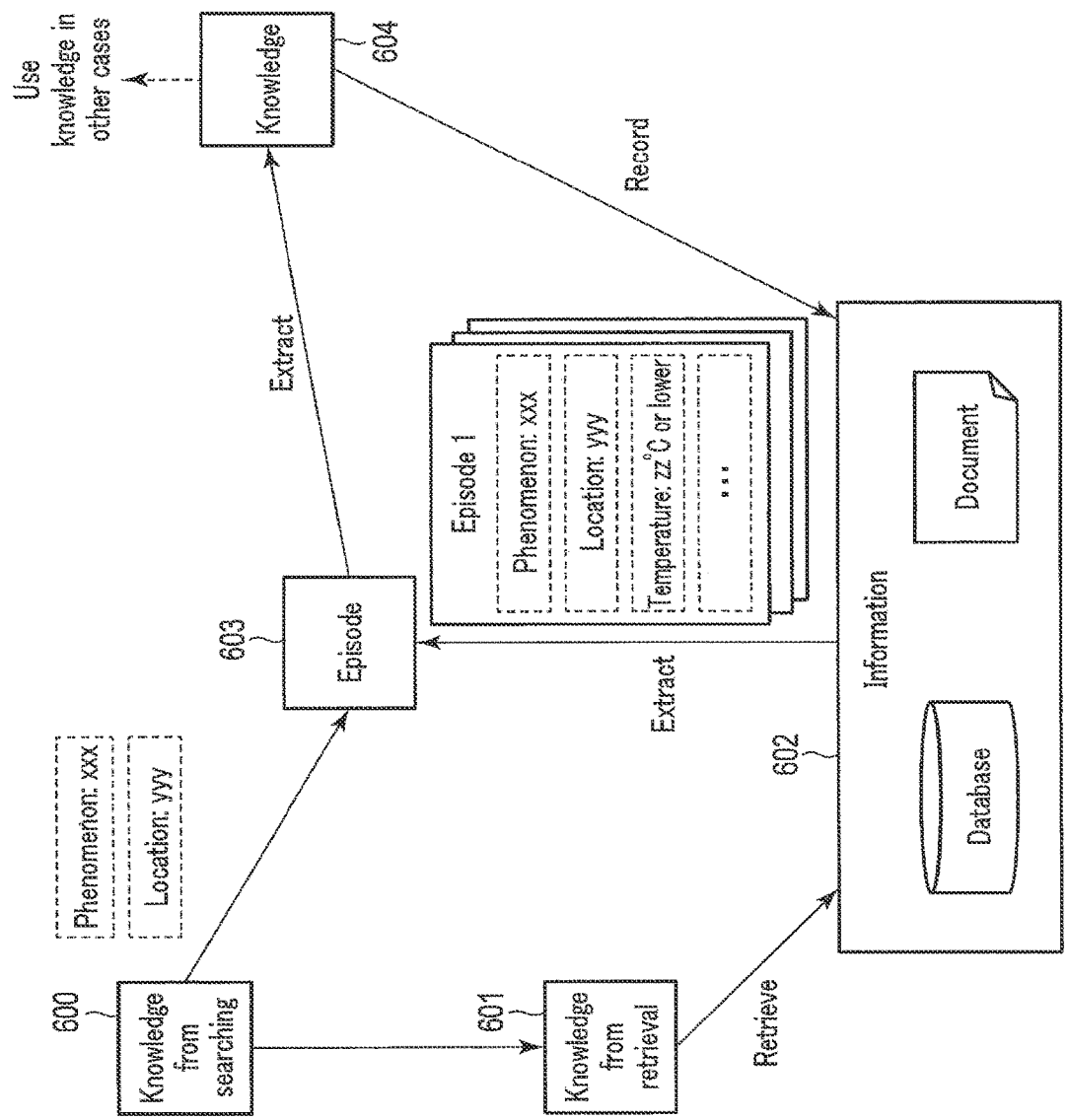
F I G. 24

SERVICE PROVIDING SYSTEM, BUSINESS ANALYSIS SUPPORT SYSTEM, AND METHOD

CROSS-REFERENCE TO RELATED APPLICATIONS

This application is a Divisional of U.S. patent application Ser. No. 16/840,781, filed on Apr. 6, 2020, which is a Continuation Application of PCT Application No. PCT/JP2018/037129, filed Oct. 4, 2018 and based upon and claiming the benefit of priority from Japanese Patent Application No. 2017-196391, filed Oct. 6, 2017, the entire contents of all of which are incorporated herein by reference.

FIELD

Embodiments described herein relate generally to a service providing system, a business analysis support system, and a method.

BACKGROUND

In recent years, a so-called cloud system has been developed which realizes a mechanism (PaaS, SaaS) that can provide, for example, a platform function as a service via the Internet.

The cloud system can be used, for example, to construct or operate a business analysis support system for analyzing video and audio by a computer, analyzing behavior of a person based on the analysis result, and analyzing an operational situation of a store or the like of service industries.

As a kind of cloud system, a service providing system capable of providing a software function (collectively referred to as an information processing function) including a so-called artificial intelligence (AI) function as a service is considered to be effective for constructing various systems such as a business analysis support system. Therefore, it is required to realize a service providing system capable of providing an information processing function effective for various system constructions as a service.

BRIEF DESCRIPTION OF THE DRAWINGS

FIG. 1 is a block diagram showing the configuration of a service providing system according to an embodiment.

FIG. 2 is a diagram for illustrating the concept of an information processing function that can be provided as a service according to the embodiment.

FIG. 3 is a block diagram showing the configuration of an information processing function according to the embodiment.

FIG. 14 is a diagram for illustrating an example of episode registration processing according to the second embodiment.

FIG. 15 is a diagram for illustrating an example of episode retrieval processing according to the second embodiment.

FIG. 18 is a diagram showing an example of a table structure relating to an episode DB according to Embodiment 2.

FIG. 19 is a diagram showing an example of a table structure relating to the episode DB according to Embodiment 2.

FIG. 20 is a diagram showing an example of a table structure relating to the episode DB according to Embodiment 2.

FIG. 21 is a diagram showing an example of a table structure relating to the episode DB according to Embodiment 2.

FIG. 22 is a diagram showing an example of a table structure relating to the episode DB according to Embodiment 2.

FIG. 23 is a diagram showing an example of a table structure relating to the episode DB according to Embodiment 2.

FIG. 24 is a diagram showing a modification of Embodiment 2.

DETAILED DESCRIPTION

Figure 4:
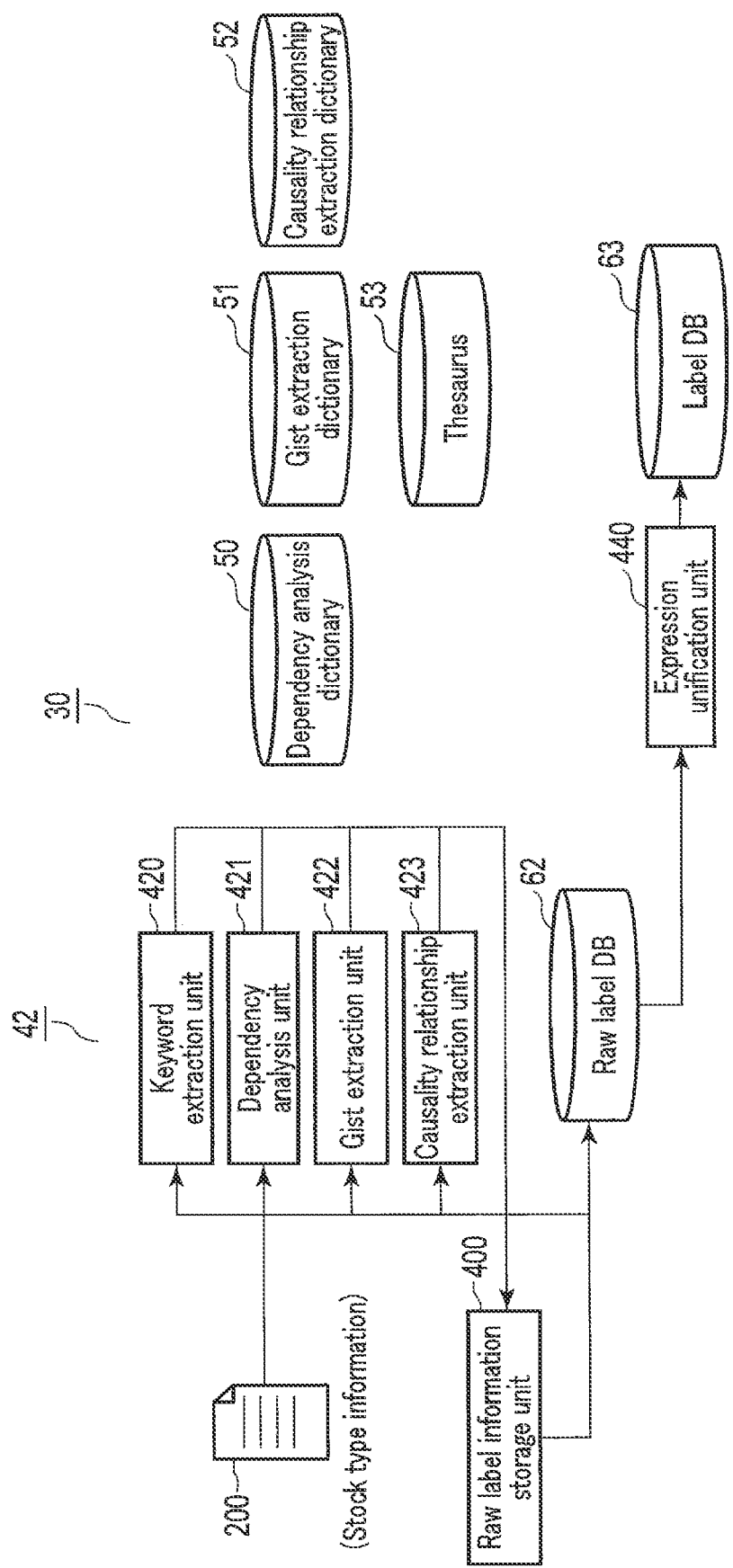
FIG. 4 is a block diagram showing the configuration of a knowledge systematization processing unit according to the embodiment.

Hereinafter, embodiments will be described with reference to the drawings.

According to an embodiment, there is provided a service providing system which provides an information processing function as a service by using a network and a computer. The computer is configured to realize:

information retrieval unit that retrieves information on an analysis target and information indicating a condition of the analysis target; knowledge base construction unit that constructs a knowledge database for acquiring knowledge corresponding to the condition of the analysis target, based on the information retrieved by the information retrieval unit; and knowledge presentation unit that presents knowledge corresponding to the condition of the analysis target from the knowledge database.

[System Configuration]

FIG. 1 is a block diagram showing the configuration of a service providing system according to the present embodiment. This system is a kind of cloud system that realizes a mechanism for providing, for example, a platform function (a software function serving as a basis of an information processing function) as a service via the Internet. Specifically, the system provides, for example, Platform as a service (PaaS) or Software as a Service (SaaS). Furthermore, this system provides, as a service, a software function including an artificial intelligence (AI) function such as a knowledge base (hereinafter, may be collectively referred to as an "information processing function").

As shown in FIG. 1, the primary elements of this system are a server system 1 and the Internet 2 representing a network. The server system 1 includes a computer 10 and a storage 20. The computer 10 executes various types of information processing for realizing a function (mechanism) for providing an information processing function as a service. The information processing function is, for example, a platform function for constructing a business analysis support system and operating various applications, as will be described later.

As will be described later, the computer 10 includes a processing unit 11 that executes knowledge structuring/learning processing for generating a knowledge base for the purpose of realizing the AI function. The storage 20 is a storage device that stores data and information relating to information processing by the computer 10 and functions as a storage for constructing a knowledge database 21 according to the present embodiment.

In the present embodiment, the server system 1 provides an information processing function as a service to a client system 3 via the Internet 2. The client system 3 is a system used by a user who connects the client system 3 to the Internet 2 and receives a service. Here, the user generically means a company, such as a client, a customer, and a system integrator (SIer). The client system 3 includes, for example, a terminal device 13 such as a personal computer, an output device 14 including a display device, etc., an input device 15 including a keyboard, etc., a storage 16, and an IoT (Internet of Things) device 17.

The IoT device 17 includes an image sensor (such as a camera), an audio sensor (such as a microphone), and various sensors that detect user behavior, and transmits each piece of sensor data to the terminal device 13.

Furthermore, the IoT device 17 can transmit each piece of sensor data to the server system 1 via the Internet 2.

[Overview of Service Provision]

FIG. 2 is a diagram illustrating the concept of an information processing function that can be provided as a service by the server system 1 of the present embodiment via the Internet 2. In the present embodiment, the information processing function that can be provided as a service includes a function of constructing the knowledge database 21, which is realized by the computer 10 by executing the structuring/learning processing unit 11, and a function of presenting knowledge from the knowledge database 21.

As shown in FIG. 2, in order to realize a function of constructing the knowledge database 21, the information processing function includes a knowledge systematization processing unit 30, a mapping processing unit 31, and a condition identification processing unit 32. Furthermore, the information processing function includes a knowledge presentation processing unit 33 that presents knowledge from the knowledge database 21.

The knowledge systematization processing unit 30 generates a knowledge base in which knowledge is systematized from stock type information 200. The knowledge base includes, for example, rules, regulations, and the like indicating how to solve an event (at what time and how to do so). The knowledge base is readable by a computer, is registered as data in a format that is logical and conforms to a predetermined rule, and is constructed as a knowledge database (knowledge DB) 21.

Here, the stock type information 200 is stored information including a procedure manual, past business information, sensor data from the IoT device 17, and the like. The stock type information 200 includes, for example, information analyzed or stored by a system such as Customer Relationship Management (CRM), Enterprise Resources Planning (ERP), and Document Management System (DMS). Furthermore, the knowledge systematization processing unit 30 also uses provided information 220 on knowledge (know-how) of a specific field provided by a knowledge holder, such as a consultant, to systematize knowledge and generate a knowledge base.

The mapping processing unit 31 maps (correlates and associates) a condition (situation) of an actual event with the knowledge (how the situation was addressed at that time), and generates a mapped knowledge base. The mapping processing unit 31 uses the provided information 220 and a presentation result fed back from the knowledge presentation processing unit 33.

The condition identification processing unit 32 identifies the condition (situation) of the event that has actually occurred, based on flow type information 210 (what is happening now), and generates an identified knowledge base. The flow type information 210 includes a report, log information of a conversation, sensor data from the IoT device 17, and the like.

The knowledge presentation processing unit 33 executes processing for presenting knowledge mapped to a condition (situation) similar to the condition (situation) of the event identified by the condition identification processing unit 32 from the knowledge database 21 in which each knowledge base has been structured.

The present embodiment can provide the information processing function of the above concept as a service to the client system 3 via the Internet 2. That is, the present embodiment can realize, for example, a PaaS function which constructs the knowledge database 21 and provides knowledge based on the knowledge database 21 as a service.

[Information Processing Function Provided as a Service]

FIG. 3 is a block diagram for illustrating the configuration of the information processing function provided as a service. FIG. 3 shows a configuration for realizing the concept of the information processing function shown in FIG. 2 as a system including interface layers 40 and 41, summary layers 42 and 43, a structuring layer 44, and a knowledge base layer. The interface layers 40 and 41 specifically include a Web-API (Application Programming Interface) that functions on the Web. The summary layers 42 and 43 each include a data source add-on function as needed. The knowledge base layer includes each database (DB) 60 to 65.

As shown in FIG. 3, the stock type information 200 and the flow type information 210 are both assumed to be document information, and specific examples thereof include specifications of business or equipment, contracts, various regulations, medical records of hospitals, and various history documents. The summary layer 42 inputs a stock type document 200. The summary layer 43 inputs a flow type document 210. The summary layers 42 and 43 include keyword extraction units 420 and 430, dependency analysis units 421 and 431, gist extraction units 422 and 432, and causality relationship extraction units 423 and 433, respectively.

The keyword extraction units 420 and 430 execute keyword extraction processing. The dependency analysis units 421 and 431 refer to a dependency analysis dictionary 50 and execute dependency analysis processing. The gist extraction units 422 and 432 refer to a gist extraction dictionary 51 and execute gist extraction processing. The causality relationship extraction units 423 and 433 refer to a causality relationship extraction dictionary 52 and execute causality relationship extracting processing.

The interface layer 40 includes a raw label information storage unit 400 that stores raw label (original label) information output from the summary layer 42, a raw label edition unit 401, and a mapping edition unit 402. The interface layer 41 includes a raw label information storage unit 410 for storing raw label information output from the summary layer 43, an associated label information storage unit 411 for storing associated label information, and a candidate document set storage unit 412 for storing a set of candidate documents.

The structuring layer 44 includes an expression unification unit 440, a mapping unit 441, an associated label acquisition unit 442, and a narrowing unit 443. Furthermore, the knowledge base layer includes a stock type information DB 60, a history information DB 61, a raw label DB 62, a label DB 63, a mapping edition DB 64, and a mapping DB 65, and is constructed as the knowledge DB 21. Here, the stock type information DB 60 stores stock type information including the stock type document 200. The history information DB 61 stores flow type information including the flow type document 210.

In the configuration of the information processing function as described above, as shown in FIG. 2, the configuration and processing procedure of each of the knowledge systematization processing unit 30, the mapping processing unit 31, the condition identification processing unit 32, and the knowledge presentation processing unit 33 will be described.

Figure 5:
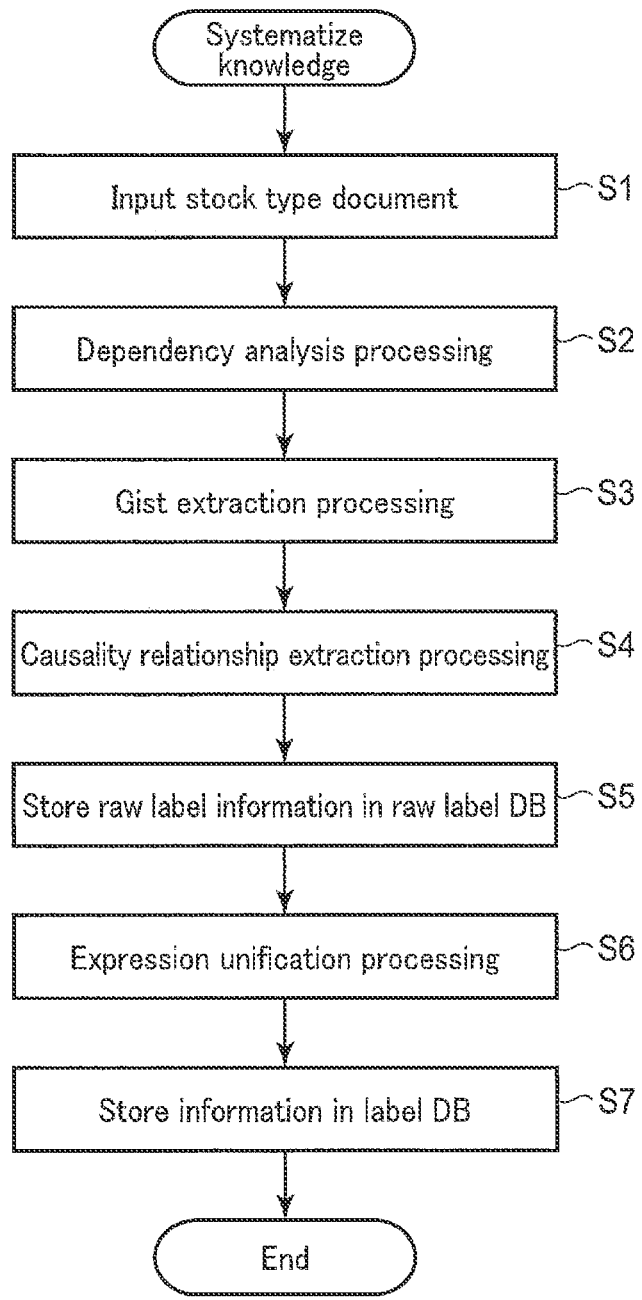
FIG. 5 is a flowchart for explaining a processing procedure of the knowledge systematization processing unit according to the embodiment.

FIG. 4 is a block diagram showing the configuration of the knowledge systematization processing unit 30. FIG. 5 is a flowchart for explaining the processing procedure of the knowledge systematization processing unit 30.

As shown in FIG. 4, the knowledge systematization processing unit 30 executes a label operation on the stock type document 200 from the summary layer 42, outputs raw label information, and stores the raw label information in the raw label information storage unit 400 included in the interface layer 40. As shown in FIG. 5, the summary layer 42 inputs a stock type document 200 (S1).

The keyword extraction unit 420 included in the summary layer 42 executes processing for extracting a keyword (word) from the stock type document 200. The dependency analysis unit 421 refers to the dependency analysis dictionary 50 and executes dependency analysis processing (syntax analysis processing) on the stock-type document 200 (S2). The dependency analysis unit 421 generates, for example, raw label information in which a label indicating a relationship between keywords extracted by the keyword extraction unit 420 is added, based on the result of the dependency analysis. That is, the raw label information is information in which a label is added to each piece of text of the stock type document 200.

Similarly, the gist extraction unit 422 refers to the gist extraction dictionary 51, executes gist extraction processing on the stock type document 200 (S3), and generates, for example, raw label information in which a label indicating the type of the gist is added. In addition, the causality relationship extraction unit 423 refers to the causality relationship extraction dictionary 52 and executes causality relationship extraction processing on the stock type document 200 (S4), and generates, for example, raw label information in which a label indicating a causality relationship between texts is added.

The interface layer 40 saves the raw label information output from the summary layer 42 in the raw label information storage unit 400, and stores the raw label information together with a content ID for identifying the document information included in the input stock type document 200 (S5). Next, the expression unification unit 440 included in the structuring layer 44 refers to a thesaurus 53 and executes expression unification processing (classification, structuring, etc.) on the raw label information stored in the raw label DB 62 (S6). The expression unification unit 440 stores the label information whose expression has been unified in a label DB 63 by the expression unification processing (S7).

Figure 6:
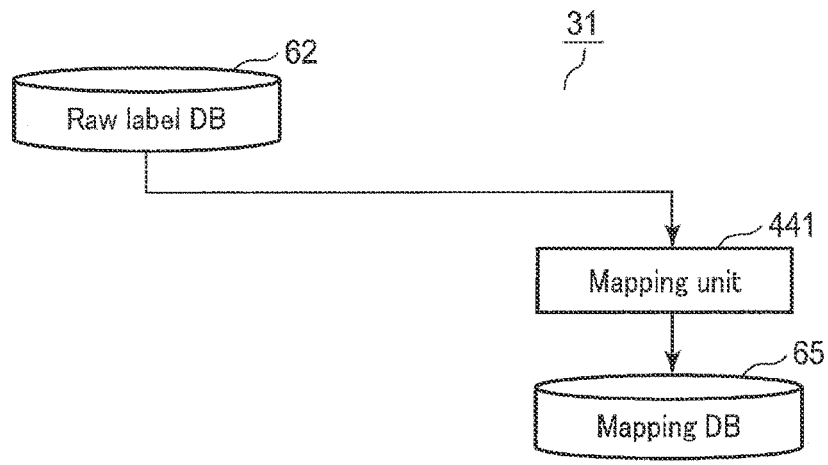
FIG. 6 is a block diagram showing the configuration of a mapping processing unit according to the embodiment.

FIG. 6 is a block diagram showing the configuration of the mapping processing unit 31. As shown in FIG. 6, the mapping processing unit 31 constructs a mapping DB 65, which is a knowledge base in which the condition (situation) of an event is mapped with (correlated to or associated with) knowledge of the event, by the mapping unit 441 included in the structuring layer 44. Specifically, the mapping unit 441 executes processing (machine learning processing) of inputting the raw label information stored in the raw label DB 62, and extracting a co-occurrence relation (e.g., word co-occurrence expression) between labels. The mapping unit 441 stores the label ID of the raw label information indicating the co-occurrence relation as mapping information, in the mapping DB 65, based on the extraction result.

Figure 7:
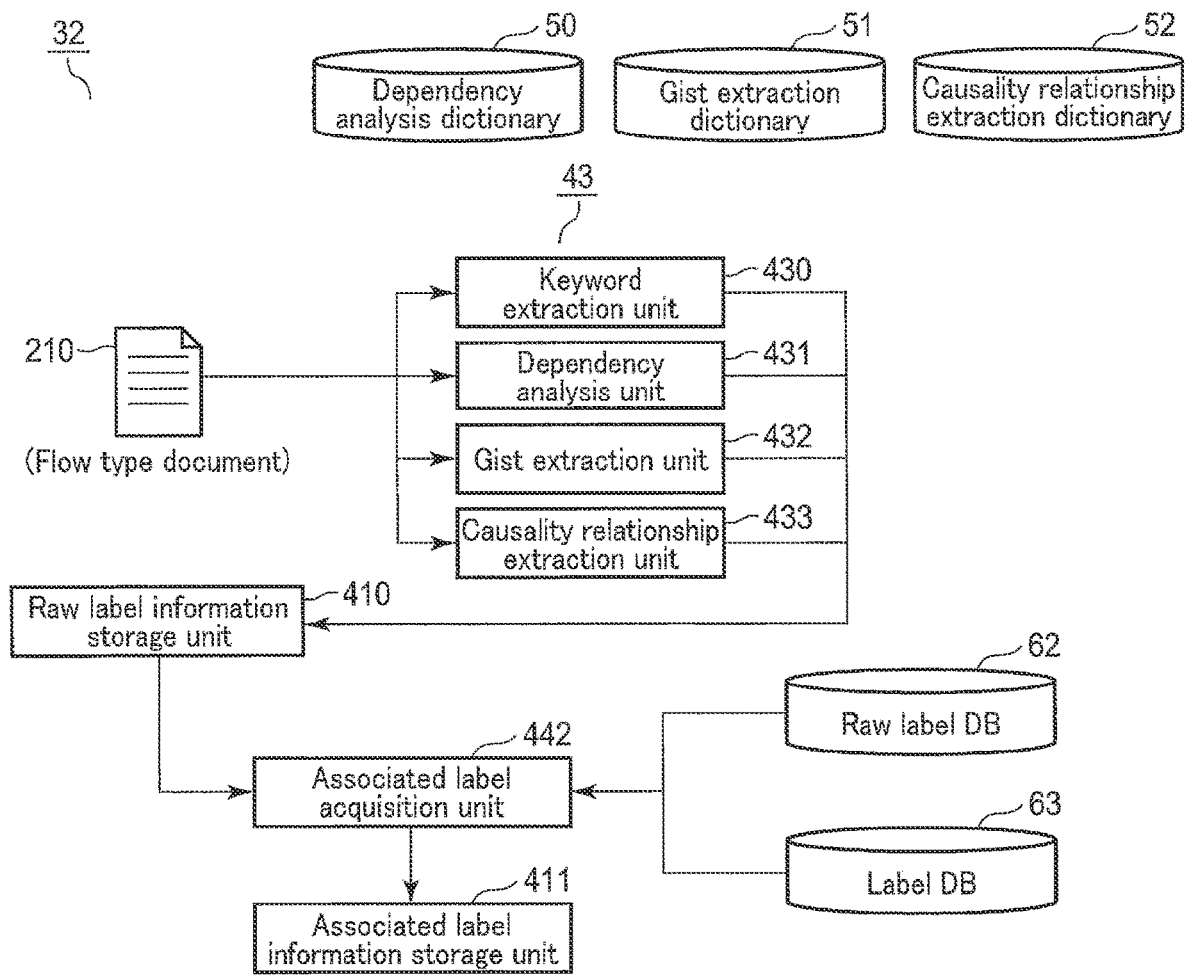
FIG. 7 is a block diagram showing the configuration of a condition identification processing unit according to the embodiment.
Figure 8:
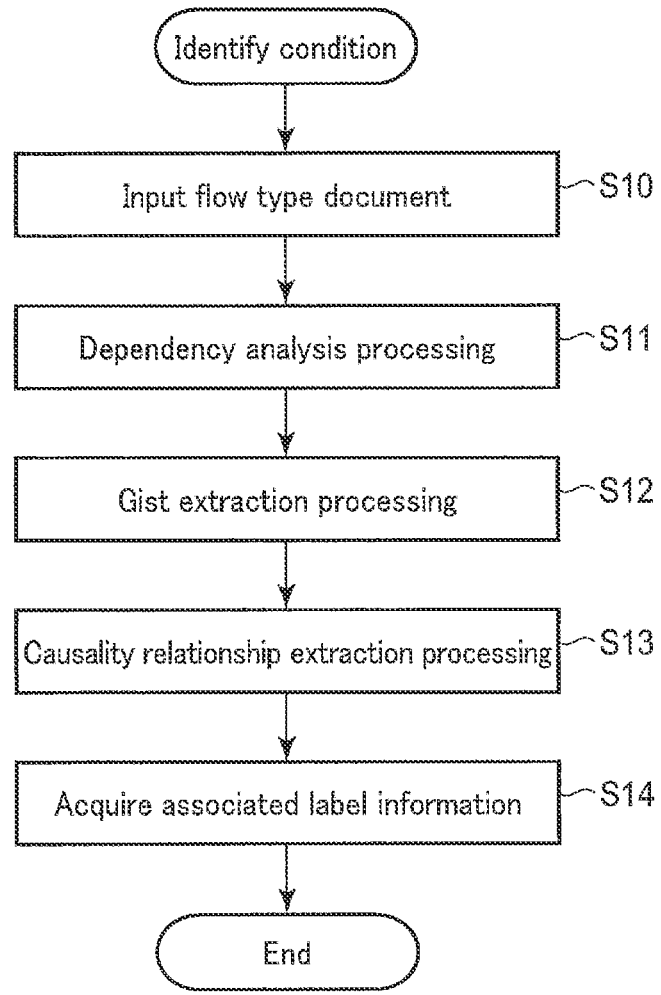
FIG. 8 is a flowchart for explaining a processing procedure of the condition identification processing unit according to the embodiment.

FIG. 7 is a block diagram showing the configuration of the condition identification processing unit 32. FIG. 8 is a flowchart for explaining the processing procedure of the condition identification processing unit 32.

As shown in FIG. 7, the condition identification processing unit 32 executes a label operation on the flow type document 210 from the summary layer 43, outputs raw label information, and stores the raw label information in the raw label information storage unit 410 included in the interface layer 41. As shown in FIG. 8, the summary layer 43 inputs the flow type document 210 (S10).

The keyword extraction unit 430 included in the summary layer 43 executes processing of extracting a keyword (word) from the flow type document 210. The dependency analysis unit 431 refers to the dependency analysis dictionary 50 and executes dependency analysis processing (syntax analysis processing) on the flow type document 210 (S11). The dependency analysis unit 431 generates, for example, raw label information in which a label indicating a relationship between keywords extracted by the keyword extraction unit 420 is added, based on the result of the dependency analysis. That is, the raw label information is information in which a label is added to each text of the flow type document 210.

Similarly, the gist extraction unit 432 refers to the gist extraction dictionary 51 and executes the gist extraction processing on the flow type document 210 (S12), and generates, for example, raw label information in which a label indicating the type of the gist is added. In addition, the causality relationship extraction unit 433 refers to a causality relationship extraction dictionary 52 and executes causality relationship extraction processing on the flow type document 210 (S13), and generates, for example, raw label information in which a label indicating a causality relationship between texts is added.

The interface layer 41 stores the raw label information output from the summary layer 43 in the raw label information storage unit 410. Next, the associated label acquisition unit 442 included in the structuring layer 44 acquires associated label information by using the raw label information (S14). Specifically, the associated label acquisition unit 442 refers to the raw label information (information in which a label is added to the stock type document 200) stored in the raw label DB 62 and the label information after the expression unification processing stored in the label DB 63 is performed to acquire the associated label information (similar label information), and stores the associated label information in the associated label information storage unit 411 included in the interface layer 41.

Figure 9:
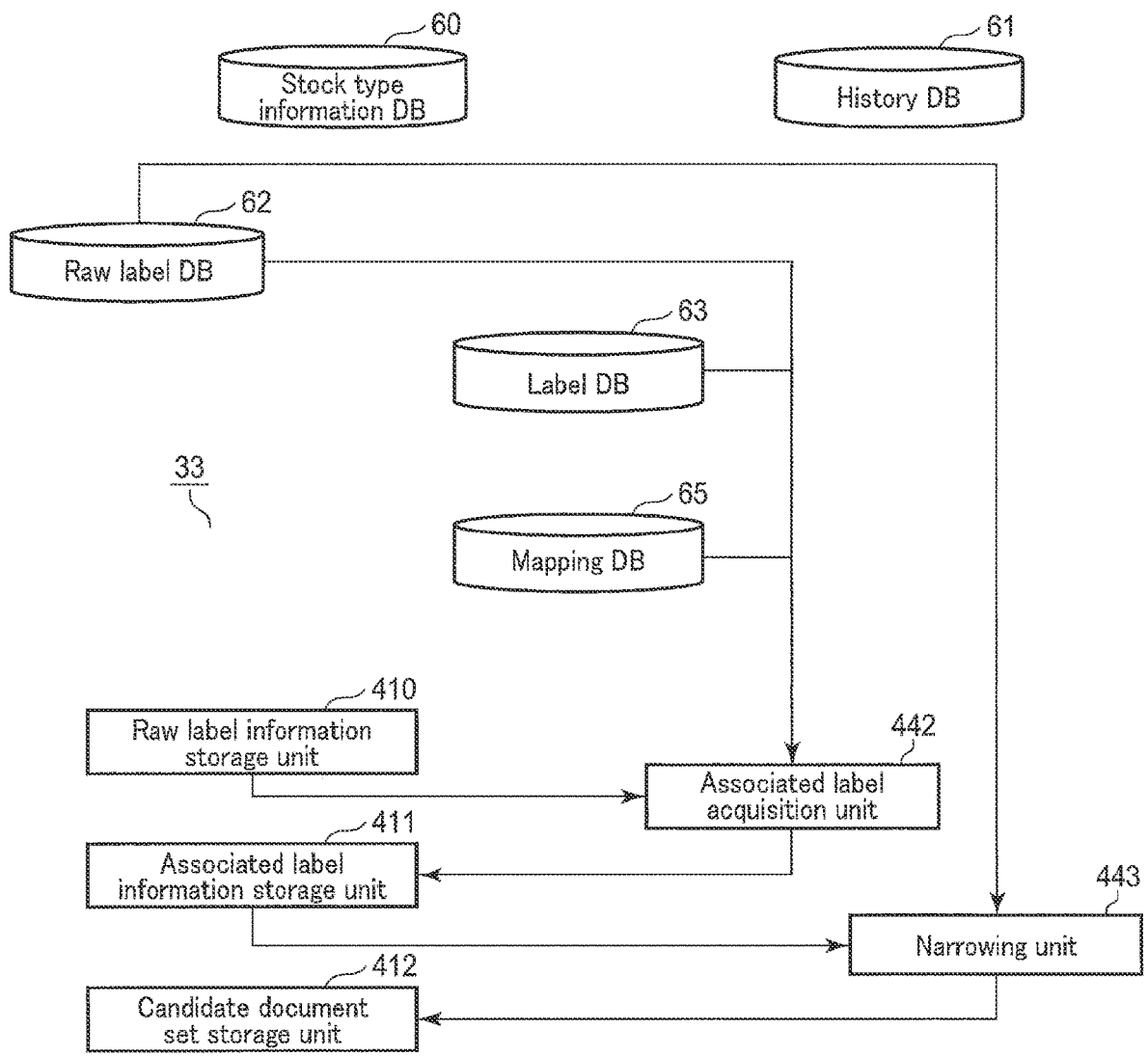
FIG. 9 is a block diagram showing the configuration of the knowledge presentation processing unit according to the embodiment.
Figure 10:
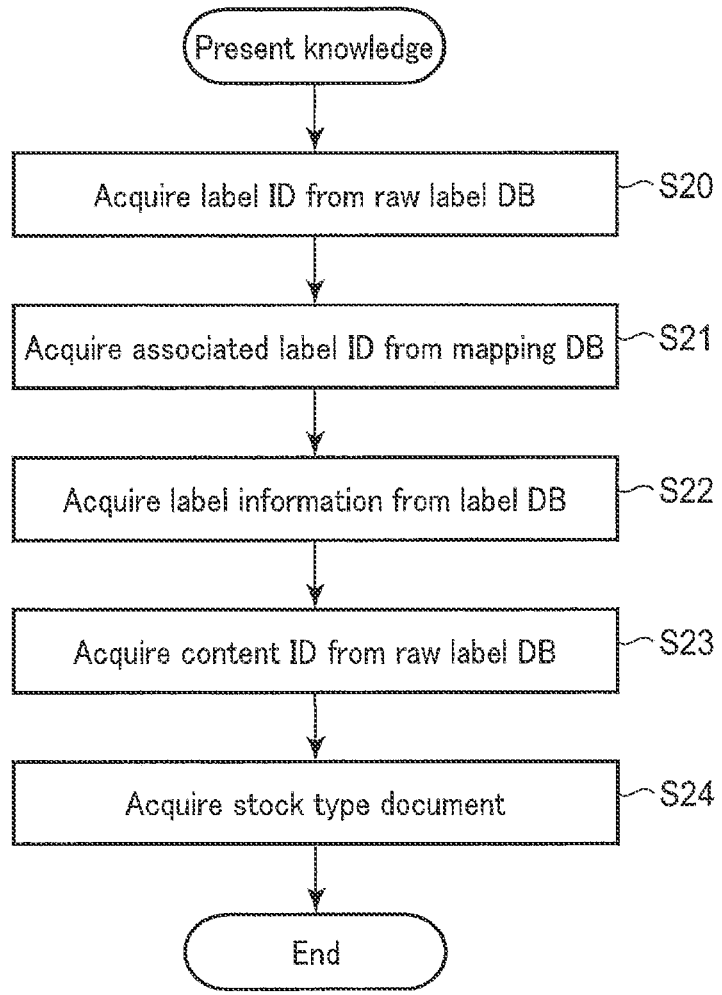
FIG. 10 is a flowchart for explaining a processing procedure of a knowledge presentation processing unit according to the embodiment.

FIG. 9 is a block diagram showing the configuration of the knowledge presentation processing unit 33. FIG. 10 is a flowchart for explaining the processing procedure of the knowledge presentation processing unit 33.

As shown in FIG. 9, the knowledge presentation processing unit 33 executes processing for presenting knowledge mapped to a condition (situation) similar to the condition (situation) of the event identified by the condition identification processing unit 32 through the associated label acquisition unit 442 and the narrowing unit 443 included in the structuring layer 44. Specifically, the knowledge presentation processing unit 33 acquires (retrieves) the stock type document 200 from the stock type information DB 60 by using the associated label information associated with the raw label information of the flow type document 210.

As shown in FIG. 10, the associated label acquisition unit 442 acquires the label ID (identification information of the label information) of the raw label information (information in which a label has been added to the stock document 200) stored in the raw label DB 62 by using the raw label information (information in which a label has been added to the flow type document 210) stored in the raw label information storage unit 410 included in the interface layer 41 (S20). The associated label acquisition unit 442 acquires an associated label ID from the mapping DB 65 by using the acquired label ID (S21).

Furthermore, the associated label acquisition unit 442 acquires associated label information (similar label information) from the raw label DB 63 by using the label ID of the raw label information stored in the raw label DB 62 and the associated label ID acquired from the mapping DB 65 (S22). The associated label acquisition unit 442 stores the acquired associated label information in the associated label information storage unit 411 included in the interface layer 41.

Next, the narrowing unit 443 included in the structuring layer 44 acquires the associated label information from the associated label information storage unit 411, and acquires a content ID from the raw label DB 62 by using the label ID of the associated label information (S23). The content ID is raw label information to be stored in the raw label DB 62, i.e., information for identifying document information included in the stock type document 200 to which a label has been added.

The narrowing unit 443 acquires a candidate document set including the corresponding stock type document information by using the content ID (S24). The narrowing unit 443 stores the acquired candidate document set in the candidate document set storage unit 412 included in the interface layer 41. As a result, a candidate document set including stock type document information retrieved based on the associated label information can be presented as knowledge mapped to a similar condition (situation), from the interface layer 41.

It should be noted that the mapping processing unit 31 can use the presented candidate document set as a fed back presentation result. In the present embodiment, the case where document information is applied as stock type information and flow type information has been described; however, the stock type information and flow type information is not limited thereto, and information in the format of image information and acoustic information, etc. may also be applied thereto.

As described above, according to the service providing system of the present embodiment, by being applied to a cloud system, it is possible to provide an information processing function including a function of constructing the knowledge database 21 and a function of presenting knowledge, which corresponds to a platform function, as a service via the Internet. Therefore, the user who receives the information processing function as a service from the service providing system of the present embodiment can use the information processing function to construct various systems such as a business analysis support system.

Embodiment 1

Figure 11:
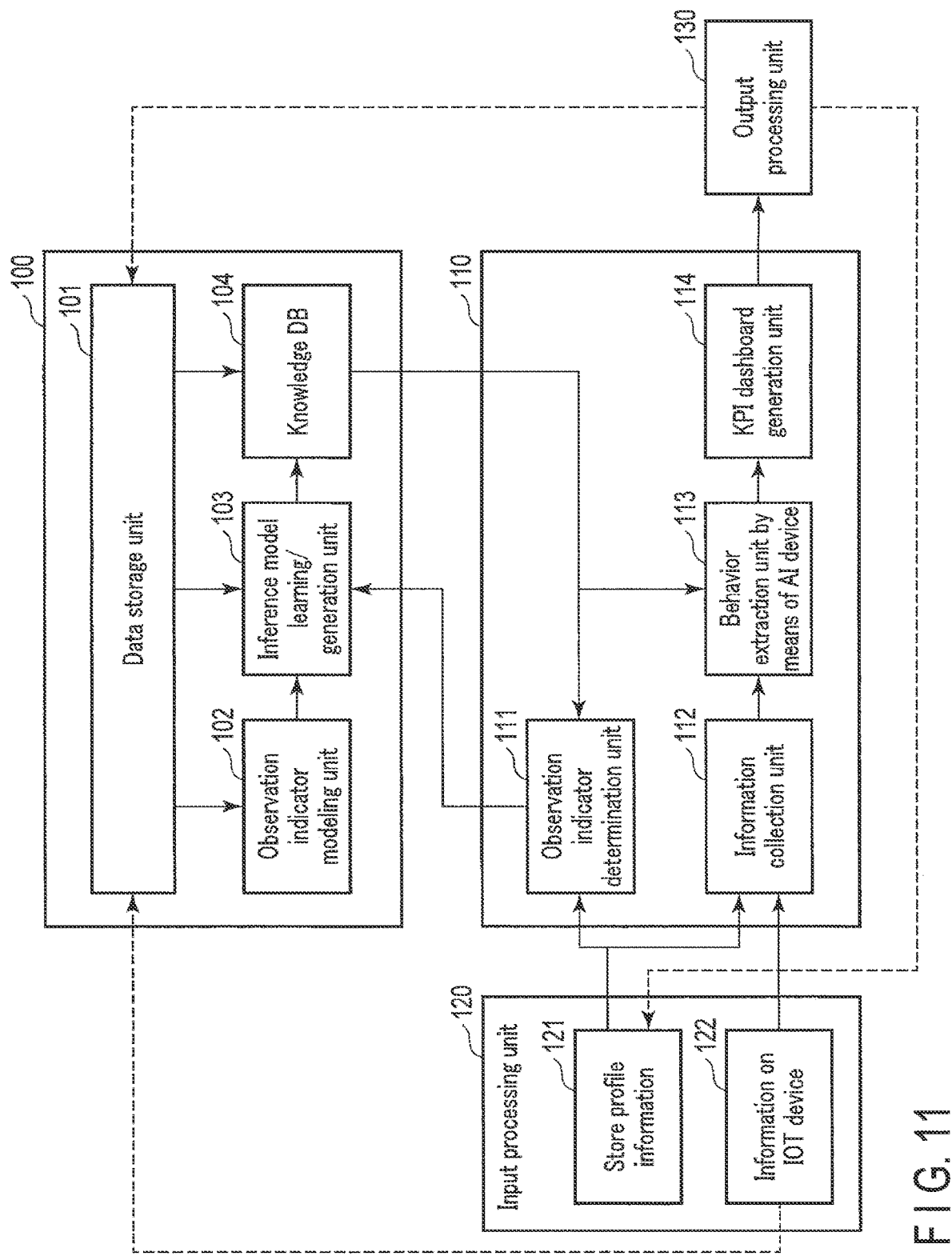
FIG. 11 is a block diagram showing the system configuration of Embodiment 1 to which the present embodiment is applied.

FIG. 11 is a block diagram for illustrating the configuration of a business analysis support system when the present embodiment is applied to the construction of the business analysis support system. The business analysis support system is applicable to, for example, a store management business model, and specifically includes a function of generating and outputting a Key Performance Indicator (KPI) dashboard required for store management.

As shown in FIG. 11, the present system includes a modeling layer 100 and an observation layer 110 as a service basis provided by the server system 1 to the client system 3. That is, the client system 3 constructs a business analysis support system as shown in FIG. 11 by an information processing function provided as a service from the server system 1 via the Internet 2.

In FIG. 11, an input processing unit 120 and an output processing unit 130 are respectively functions possessed by the client system 3 shown in FIG. 1. The input processing unit 120 has a function of inputting, for example, store profile information 121 input from an input device 15 and information 122 including various sensor data (such as time-series data) from an IoT device 17, in an observation layer 110. It should be noted that the information 122 of the IoT device 17 is transferred to the modeling layer 100 via the Internet 2, for example.

Here, the store profile information 121 includes, for example, the location of a store, unit prices of products sold in the store, the competitive relationship of the store, the profile information of employees working in the store, and various management information.

The output processing unit 130 includes a function of displaying and outputting a KPI dashboard on, for example, a display device of an output device 14 by a KPI dashboard generation unit 114 included in the observation layer 110 to be described later. Also, the output processing unit 130 includes a function of transferring the KPI dashboard to the modeling layer 100 via the Internet 2. Furthermore, the output processing unit 130 includes a function of feeding back the KPI dashboard to the input processing unit 120.

As shown in FIG. 11, the modeling layer 100 included in the system includes a data storage unit 101, an observation indicator modeling unit 102, an inference model learning/generation unit 103, and a knowledge database (knowledge DB) 104. The data storage unit 101 stores, in addition to the above-described KPI dashboard and the information 122 of the IoT device 17, business type/business data related to a store as an analysis target.

The business type/business data includes data on various business fields and companies.

The observation indicator modeling unit 102 generates, as a model of the observation indicator (management indicator), a model for recognizing a causality relationship associated with the business result of the store. As a specific example, it generates a model indicating a causality relationship (correlation) between an event that can be quantified with respect to the work of store employees and the sales amount of the store.

The inference model learning/generation unit 103 executes so-called AI function machine learning by using various types of data stored in the data storage unit 101. The inference model learning/generation unit 103 adjusts parameters of the model generated by the observation indicator modeling unit 102 through machine learning. For example, when the model is "Y=f (x, t)", the inference model learning/generation unit 103 finds an inference model (derivation function f) by machine learning for adjusting parameters x and t (for example, x is sensor data, and t is time).

The knowledge DB 104 stores an inference model (derivation function f) generated by the inference model learning/generation unit 103 of the inference model and various data stored in the data storage unit 101 as a knowledge base. Such a modeling layer 100 corresponds to a preparatory stage, and is a kind of service base for a platform function.

As shown in FIG. 11, an observation layer 110 included in the present system includes an observation indicator determination unit 111, an information collection unit 112, a behavior extraction unit 113 based on an AI function, and a KPI dashboard generation unit 114. The observation layer 110 is a service basis for application functions provided as a service.

The observation indicator determination unit 111 uses the store profile information 121 input from the input processing unit 120 to determine, for example, an indicator for observing a sign of an increase or a decrease in sales of a store to be analyzed. The observation indicator determination unit 111 also determines a sampling cycle and a time zone for observation. The information collection unit 112 collects the observation indicator determined by the observation indicator determination unit 111 from the store profile information 121 and the information 122 of the IoT device 17. Here, the information collection unit 112 collects data through sampling, including data filtering and preprocessing, instead of collecting the all of the data.

The behavior extraction unit 113 by means of the AI function acquires from the knowledge DB 104 an inference model (the function f) that can measure the observation indicator determined by the observation indicator determination unit 111. The behavior extraction unit 113 recognizes (extracts) behavior of an employee of the store (an event that can be digitized), which indicates a causality relationship (correlation) with the sales amount of the store, for example, by using the inference model and the data collected by the information collection unit 112.

The KPI dashboard generation unit 114 generates a KPI dashboard based on the recognition (extraction) result of the behavior extraction unit 113 by means of the AI function, and outputs the KPI dashboard to the output processing unit 130. The KPI dashboard is, for example, display information that displays management information including a Key Performance Indicator (KPI) as data formatted in a list display format or time-series data on a screen of a display device. The KPI dashboard may also include display information that also displays other stores of the same company to be compared and comparison results with other companies in the same industry. Specifically, the KPI dashboard is information in a display format that can be used by, for example, a person to analyze the condition and situation of a store through a fixed-point observation and make a decision for improving the condition and situation of the store. The KPI dashboard is, for example, information in a display format that can be used by a person to plan and execute measures in store management. Furthermore, the KPI dashboard is, for example, information in a display format by which predicted values and actual values of store sales and the like can be grasped as store management information.

By a construction of the business analysis support system as described above, it is possible to model the correlation (causality relationship) between the behavior of a person who is active in a specific place such as a store and a management indicator, and store it as a knowledge base in the knowledge DB 104. It is possible to determine an inference model to be used from the knowledge DB 104 based on profile information of a store or the like to be analyzed and information from an IoT device and to realize visualization of management information (KPI dashboard) including Key Performance Indicator (KPI). Therefore, it is possible to realize a useful business analysis support system that can periodically provide information necessary for management decision-making of stores and the like.

Conventionally, for example, when a video analysis result indicating a person's behavior is applied to a business analysis support system, a time-consuming manual operation is required, for example, a person visually recognizes a video of a clerk at a store or the like or a worker at a manufacturing site and inputs analysis information (a flag, a tag, etc.). The present business analysis support system allows efficient and varied business analysis supports without requiring a time-consuming manual operation by using not only a video image showing a behavior of a person but also a voice of the person and various kinds of sensor information and performing behavior extraction by means of an AI function.

Embodiment 2

Figure 12:
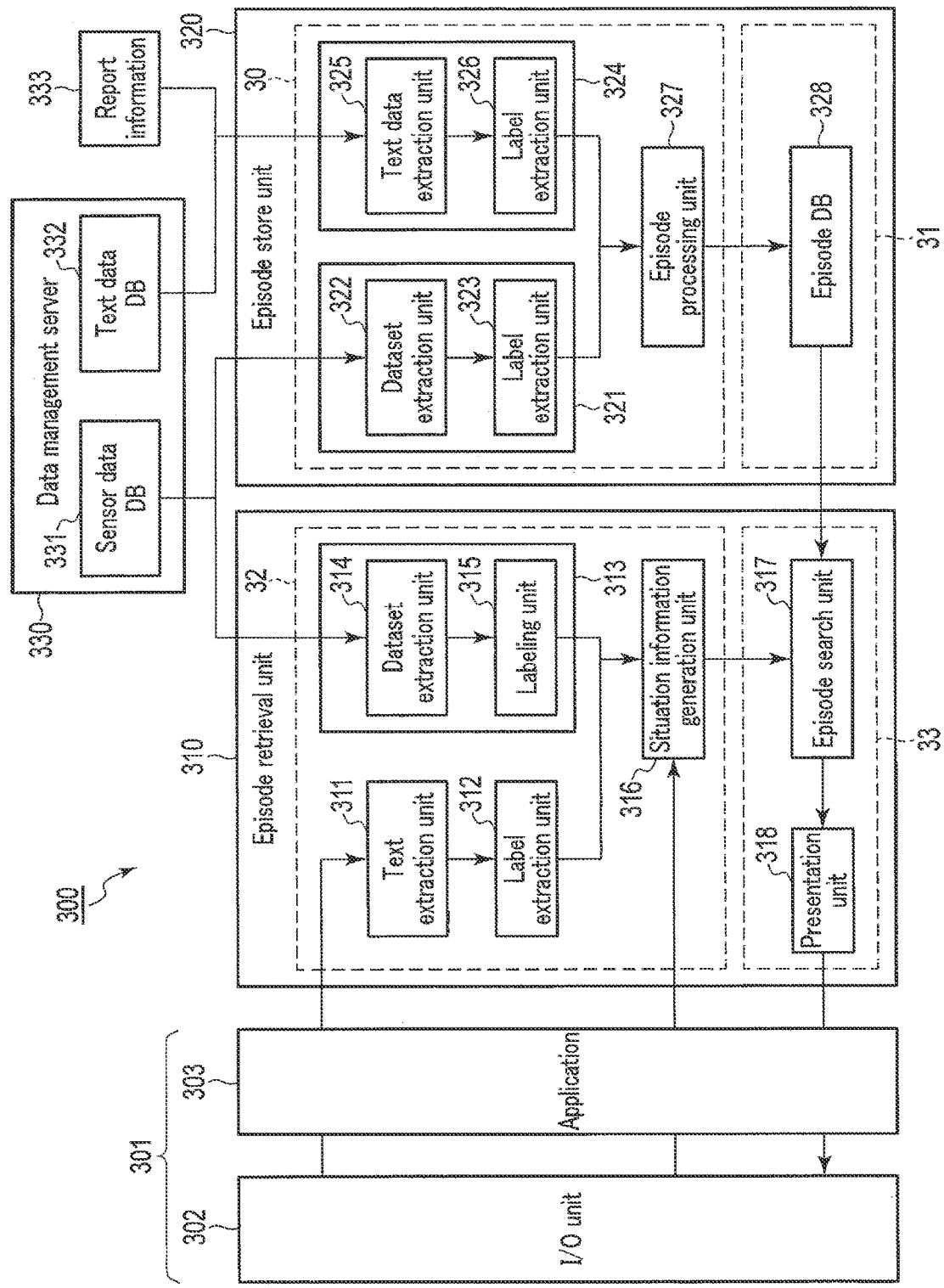
FIG. 12 is a block diagram showing the system configuration of Embodiment 2 to which the present embodiment is applied.

FIG. 12 is a block diagram for illustrating the configuration of the system when the present embodiment is applied to, for example, the construction of a support system for facility maintenance. Specifically, for example, when a failure occurs in equipment of a facility at a manufacturing site, the system realizes a function that presents necessary knowledge as an appropriate countermeasure against the failure.

[System Configuration]

As shown in FIG. 12, a system 300 includes a terminal device 301, an episode retrieval unit 310, an episode storage unit 320, and a data management server 330. The terminal device 301 includes an input/output unit 302 and an application 303, and constitutes an interface between the user and the episode retrieval unit 310. The terminal device 301 executes processing of inputting a command or text information according to a user operation in the episode retrieval unit 310, and processing of outputting knowledge presented from the episode retrieval unit 310 and an episode to be described later on a display screen.

The episode retrieval unit 310 and the episode storage unit 320 are information processing functions provided as services from the server system 1 of the present embodiment. The episode retrieval unit 310 includes components corresponding to the condition identification processing unit 32 and the knowledge presentation processing unit 33 as the concept of the information processing function shown in FIG. 2. The episode storage unit 320 includes, as a concept of the information processing function shown in FIG. 2, components corresponding to the knowledge systematization processing unit 30 and the mapping processing unit 31.

The data management server 330 is an information collection unit that collects various information related to facility maintenance, and includes a sensor data DB (DB is a database) 331 and a text data DB 332. A sensor data DB 331 stores sensor data (information indicating the condition of each device), which is a sensor value of each sensor, such as a temperature and voltage of each device to be maintained. The text data DB 332 stores text data such as conversations and work histories of a worker or inspector (hereinafter collectively referred to as a "user") at a manufacturing site.

The episode storage unit 320 includes, as the knowledge systematization processing unit 30, a sensor data processing unit 321, a text data processing unit 324, and an episode processing unit 327. The sensor data processing unit 321 includes a data set extraction unit 322 and a label extraction unit 323. The text data processing unit 324 includes a text data extraction unit 325 and a label extraction unit 326.

The sensor data processing unit 321 extracts a data set including sensor data (sensor values) of each sensor, and extracts a label corresponding to each sensor value. In the data set extraction, the data set extraction unit 322 extracts a data set including the sensor data (sensor values) from each sensor collected by and stored in the data management server 330 from the sensor data DB 331. In the label extraction, the label extraction unit 323 extracts a label of, for example, "temperature" or "voltage", etc. corresponding to each sensor value from the data set.

The text data processing unit 324 extracts text data from the stored data and extracts a label from the extracted text data. In the text data extraction, a text data extraction unit 325 extracts text data collected by and stored in the data management server 330 from the text data DB332. Also, the text data extraction unit 325 extracts text data from report information 333 relating to equipment management input by the user from the terminal device 301. The text data is information describing the situation relating to each device to be maintained, which is recognized by the user, in conversations or sentences. In label extraction, the label extraction unit 326 extracts labels such as "Phenomenon", "Location", and "Measures" from text data.

As episode processing, the episode processing unit 327 generates episode information (hereinafter, simply referred to as an episode) composed of a set of elements (events) representing the situation of each device to be maintained, based on information output from the sensor data processing unit 321 and the text data processing unit 324. That is, the episode includes labels, such as "Phenomenon", "Location", "Measures", and "Temperature" as well as event information, such as keywords indicating "Phenomenon", "Location", and "Measures"; sensor values; and interpretation of sensor data. The episode corresponds to knowledge creation information (knowledge) that can be used as measures for facility maintenance.

Furthermore, the episode storage unit 320 includes an episode DB 328 as the mapping processing unit 31, and registers (stores) the episode generated by an episode processing unit 327. As will be described later, the episode retrieval unit 310 refers to the episode DB 328 to retrieve an episode corresponding to (similar to) the current situation (a failure situation that has occurred), and presents knowledge that can be used as measures for facility maintenance.

The episode retrieval unit 310 includes a sensor data processing unit 313 as the condition identification processing unit 32, similarly to the episode storage unit 320. The sensor data processing unit 313 includes a data set extraction unit 314 and a labeling unit 315. The data set extraction unit 314 extracts a data set including the sensor values of each sensor collected and stored by the data management server 330 from the sensor data DB 331, similarly to the data set extraction unit 322.

The labeling unit 315 converts an item code or the like corresponding to each sensor value from the data set by using a predetermined table, and outputs a label such as "temperature". That is, each of the label extraction units 312, 323, and 326 extracts a raw label (original label) as it is from the description included in the text data. The labeling unit 315 outputs a unified label including a raw label and a label converted into a predetermined notation.

Furthermore, the episode retrieval unit 310 includes, as the condition identification processing unit 32, a text extraction unit 311, a label extraction unit 312, and a situation information generation unit 316. The text extraction unit 311 extracts text data, which is input by the user from the terminal device 301 and describes the current status of each device to be maintained. The label extraction unit 312 extracts labels, such as "phenomenon" and "location", from the text data.

The situation information generation unit 316 generates information (episode fragment information) indicating the current situation (a failure situation that has occurred) of each device to be maintained, based on the information output from the sensor data processing unit 313, the text extraction unit 311, and the label extraction unit 312. The generation unit 316 also generates fragment information of the episode by additionally using text data describing the current situation input from the terminal device 301 by the user.

The episode retrieval unit 310 includes, as the knowledge presentation processing unit 33, an episode retrieval unit 317 and a presentation unit 318. The episode retrieval unit 317 retrieves, from the episode DB 328, an episode corresponding (similar) to information (episode fragment information) indicating the current situation (a failure situation that has occurred) generated by the situation information generation unit 316. The presentation unit 318 presents the episode, which is a retrieval result, as knowledge that can be used as measures for facility maintenance. As a result, the terminal device 301 outputs, as the retrieval result, the episode to the display screen as knowledge that can be used as measures for facility maintenance, presented from the presentation unit 318.

[System Operation]

Figure 13:
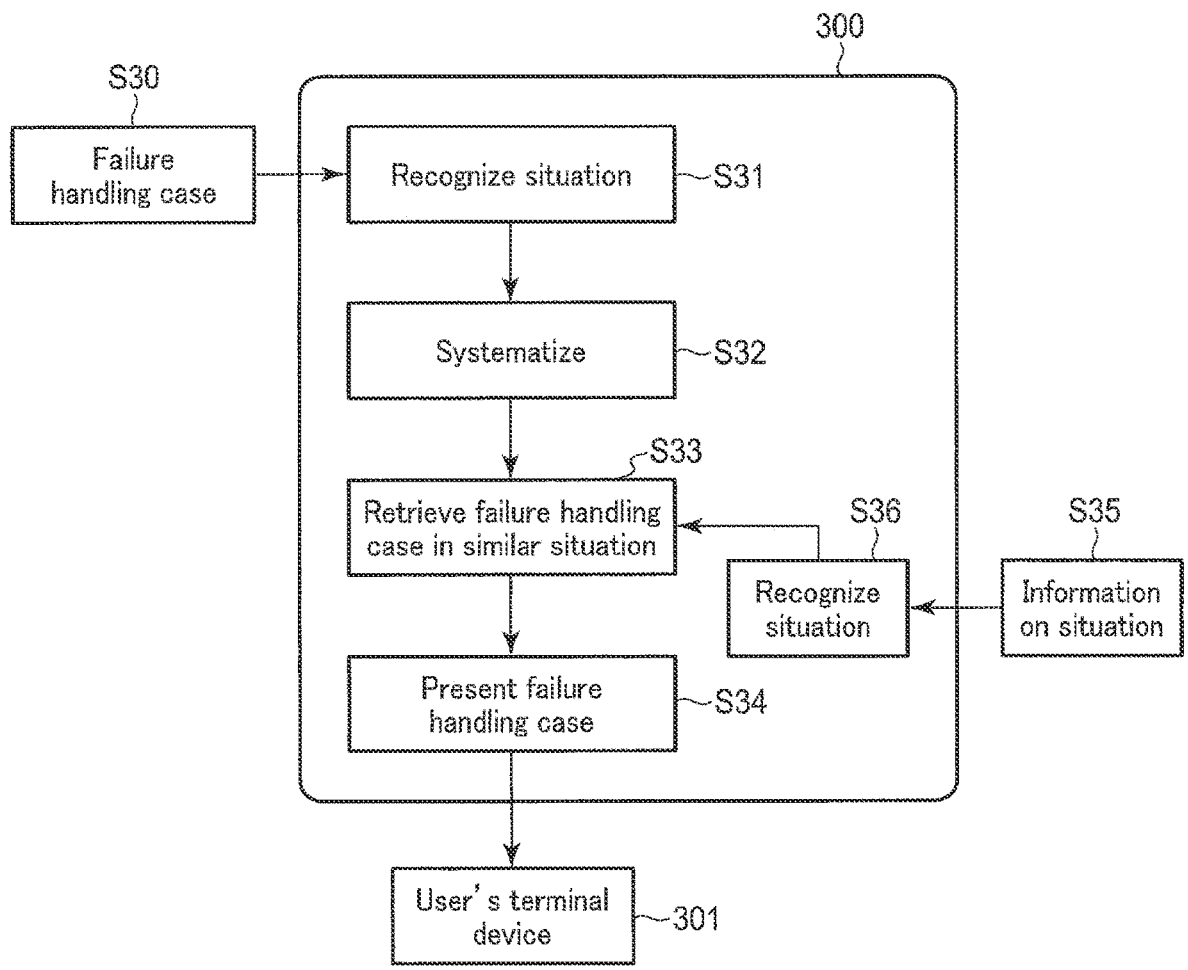
FIG. 13 is a flowchart for explaining an operation of the system according to the second embodiment.
Figure 16:
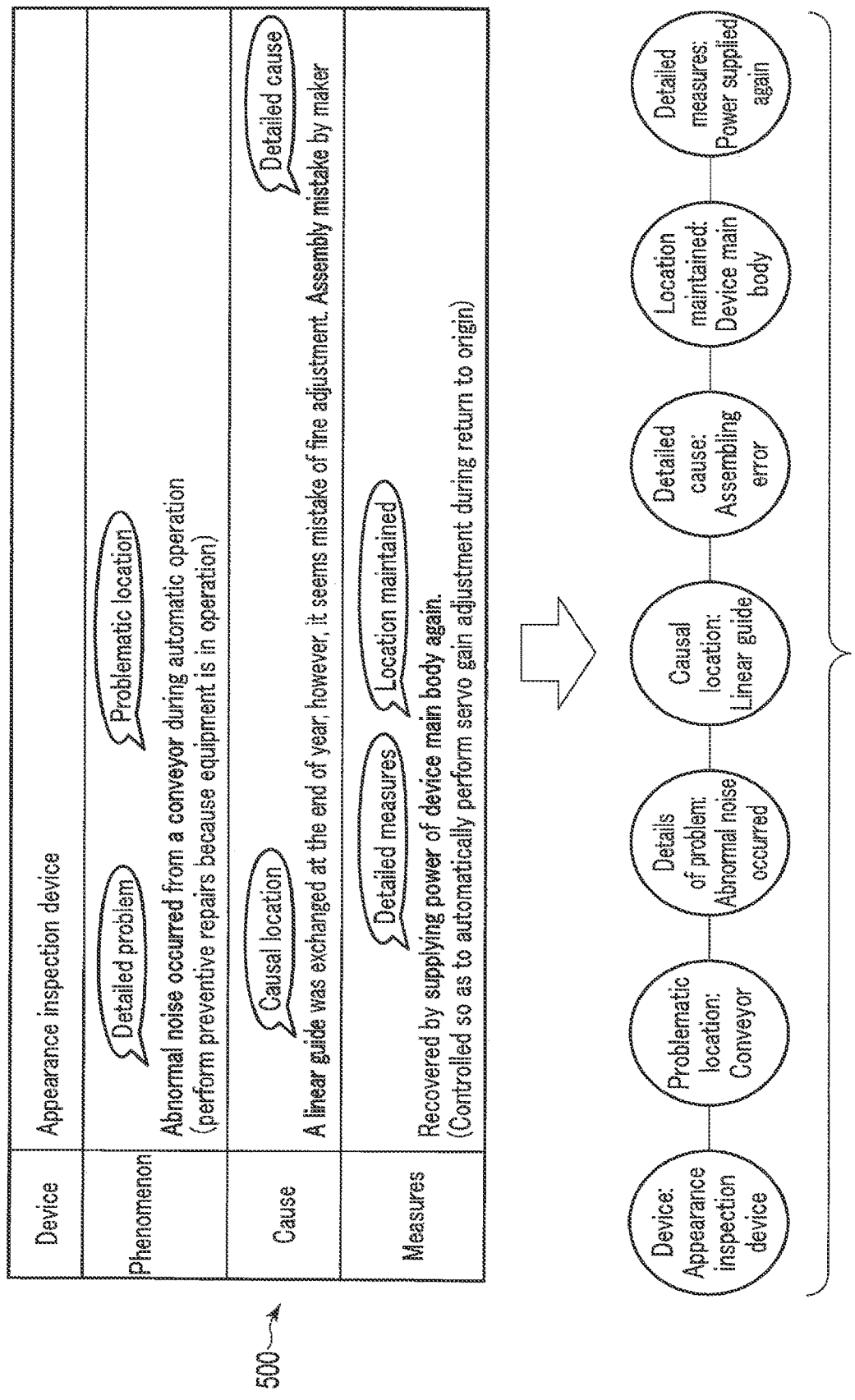
FIG. 16 is a diagram for illustrating an example of text analysis processing according to the second embodiment.
Figure 17:
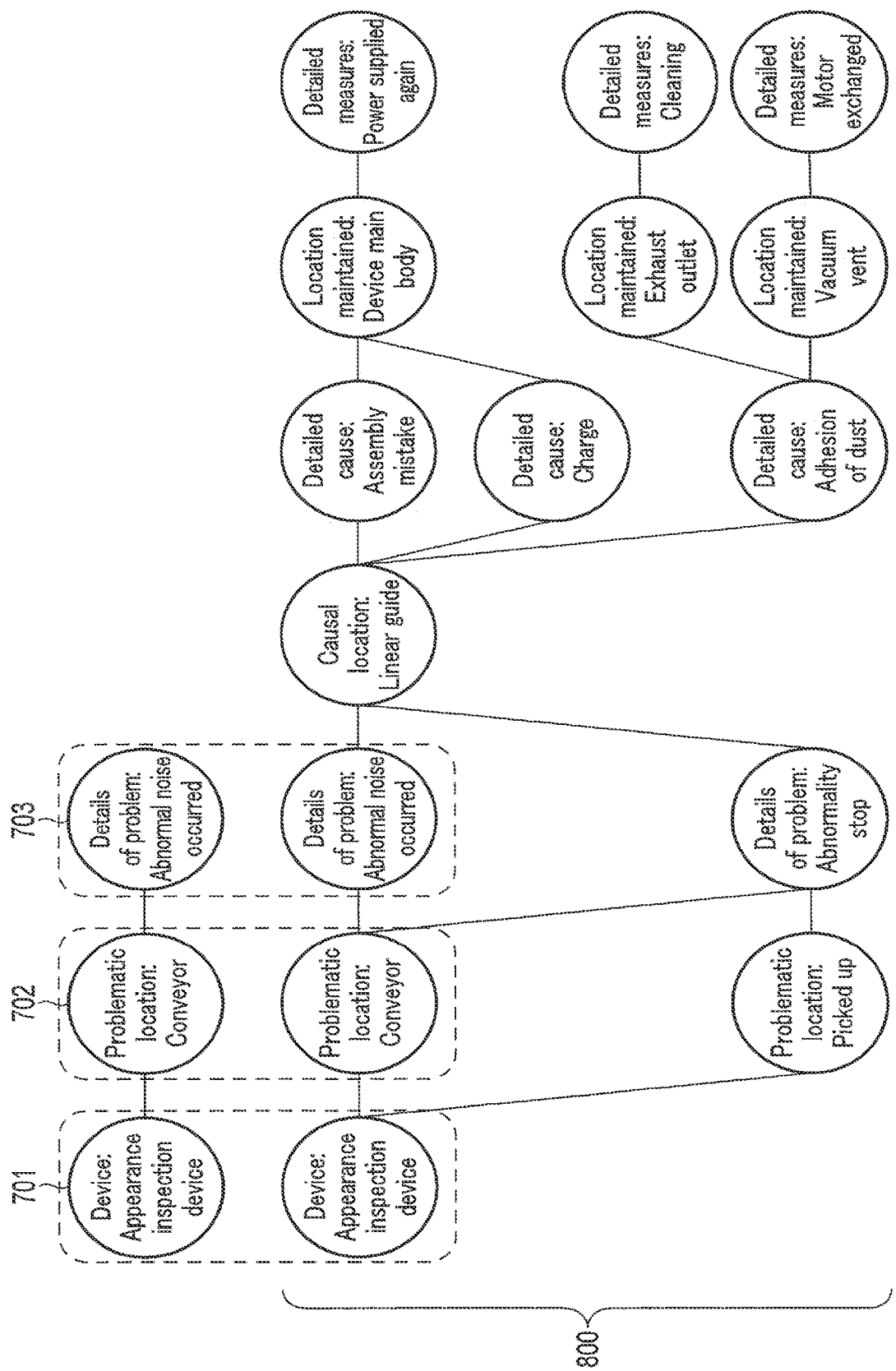
FIG. 17 is a diagram for illustrating the concept of the episode retrieval processing according to the second embodiment.

Hereinafter, the operation of the system 300 will be described with reference to FIGS. 13 to 17. FIG. 13 is a flowchart for explaining the operation of the system 300. FIG. 14 is a diagram showing an example of the episode registration processing. FIG. 15 is a diagram showing an example of the episode retrieval processing. FIG. 16 is a diagram showing an example of the text analysis processing. FIG. 17 is a diagram showing the concept of episode retrieval processing.

As shown in FIG. 13, the system 300 roughly performs processing by the episode storage unit 320 (S31, S32) and processing by the episode retrieval unit 310 (S33, S34, S36).

The episode storage unit 320, for example, inputs information on a failure handling case of each device to be maintained (S30), and executes a situation recognition process for the case (S31). Specifically, as described above, the information on failure handling case includes the sensor data stored in the sensor data DB 331 and the text data stored in the text data DB 332, in the data management server 330. The text data also includes report information 333 on facility maintenance input from the terminal device 301 by the user.

The situation recognition processing corresponds to each processing of the sensor data processing unit 321 and the text data processing unit 324. That is, the sensor data processing unit 321 extracts, from the sensor data DB 331, sensor data (sensor value) from each sensor and corresponding labels in the failure handling case. The text data processing unit 324 extracts the text data and the corresponding labels in the failure handling case from the text data DB 332.

Here, as shown in FIG. 16, the text data processing unit 324 performs text analysis processing of extracting a text component for each item (label) from text data 500 such as a report created by the user. The text component is an event that the user pays attention to in the failure handling case. Specifically, for example, in the item of "Phenomenon", items of "Conveyor" as "Problematic location" and "Abnormal noise occurred" as "Details of problem" are extracted. For example, in the item of "Cause", items such as "Linear guide" as "Cause location" and "Assembling mistake" as "Detailed cause" are extracted. Furthermore, for example, in the item of "Measures", items of "Device main body" as "Location maintained" and "Power supplied again" as "Detailed measures" are extracted. The text data processing unit 324 outputs a text analysis result 510 indicating the relationship between events in each of the above items (labels) through the text analysis processing.

Referring back to FIG. 13, the episode storage unit 320 executes knowledge creation processing based on the recognition result of the situation recognition processing (S32). The knowledge creation processing is processing of generating an episode in which sensor data (including a label) from each sensor and text data including a text analysis result 510 in a failure response case are integrated, and registering (storing) the episode in the episode DB 328. The episode is knowledge creation information that indicates a relationship between a report (text data) in a failure handling case and a situation at that time (including sensor data).

FIG. 14 is a diagram showing an example of the episode registration processing. As shown in FIG. 14, in the data management server 330, for example, text data such as a manual, a report, and a shift table and sensor data are collected as past data (S40). Next, a situation recognized result of the failure handling case is output through the situation recognition processing (S41). As described above, a specific example of the situation recognized result is a text analysis result 510 by the text data processing unit 324, for example.

Next, an episode in which the sensor data and the text data of the failure handling case are integrated through the knowledge creation processing by the episode processing unit 327 is generated, and the episode is registered (stored) in the episode DB 328 (S42). As a result, an episode, which is knowledge creation information indicating the association between the report (text data) in the failure handling case and the situation (including sensor data) at that time, is registered (stored) in the episode DB 328.

Referring back to FIG. 13, the episode retrieval unit 310 retrieves, from the episode DB 328, an episode corresponding to (similar to) the situation recognized result indicating the current situation (a failure situation that has occurred) (S33). The situation recognized result (episode fragment information) is generated by the situation information generation unit 316 (S36) based on situation information such as text data describing the current situation input from the terminal device 301 (S35). Furthermore, the episode retrieval unit 310 causes the presentation unit 318 to present the episode, which is a retrieval result, as knowledge that can be used as measures for facility maintenance (S34).

FIG. 15 is a diagram showing an example of the episode retrieval processing in association with FIG. 13. As shown in FIG. 15, a situation recognized result indicating the current situation is generated by the situation information generation unit 316 (S36). Furthermore, the generation unit 316 uses text data that describes the current situation input from the terminal device 301 by the user (S35).

The episode retrieval unit 317 retrieves, from the episode DB 328, an episode corresponding to (similar to) the situation recognized result (episode fragment information) indicating the current situation (S34). The episode retrieval unit 310 causes the presentation unit 318 to present the episode as the retrieval result (S33). As a result, the terminal device 301 outputs the episode as the retrieval result to the display screen as knowledge that can be used as measures for facility maintenance, presented from the presentation unit 318.

FIG. 17 is a diagram showing the concept of the episode retrieval processing. Here, the information indicating the current situation is assumed to be only text data, and the sensor data is omitted.

As shown in FIG. 17, the episode retrieval unit 310 retrieves, as the current situation information (a failure situation that has occurred), from the episode DB 328, a failure handling case (episode 800) similar to each event 701 to 703 of "Appearance inspection device" as "Device", "Conveyor" as "Problematic location", and "Abnormal sound occurred" as "Details of problem", for example.

In the episode DB 328, as items related to the failure handling case, which are similar to the events 701 to 703 of the current situation information, for example, respective matters, such as "Linear guide" as the item of "Causal location", and "Assembling mistake" as "Detailed cause", are registered. Furthermore, for example, in the item of "Measures", respective matters such as "Device main body" as "Location maintained" and "Power supplied again" as "Detailed measures" are registered.

In each item (label) as described above, the episode retrieval unit 310 retrieves, from the episode DB 328, an episode 800 indicating the relationship between events similar to the current situation information, and presents it as knowledge that can be used as measures for facility maintenance.

As described above, according to the present embodiment (2), it is possible to provide a system having a function of storing episodes, in which histories of text data and sensor data indicating user's experiences and knowledge about failure handling cases relating to respective devices of the entire facility maintenance target are integrated and systematized as knowledge, recognizing a failure situation occurred, and retrieving an episode corresponding to or similar to the failure situation. That is, knowledge that can be used as measures for facility maintenance can be presented at an appropriate timing, for example, to a terminal device operated by a user.

With such a system, for example, even in the case of a user who is not necessarily skilled in dealing with a failure at a manufacturing site, useful knowledge for performing failure handling processing can be obtained at an appropriate timing by retrieving an episode similar to a failure situation that has occurred, by using a terminal device. Since the episode is consequently learned by the episode processing unit 327, the episode is updated and stored as knowledge-created information effective for actual failure handling.

FIGS. 18 to 23 are diagrams each illustrating an example of a table structure related to episodes (knowledge-created information) registered in the episode DB 328.

As described above, for example, the episode storage unit 320 inputs information on a failure handling case of each device to be maintained, executes situation recognition processing for the case, and executes knowledge creation processing. The episode storage unit 320 generates an episode in which sensor data and text data in the failure handling case is integrated through the knowledge creation processing, and registers the episode in the episode DB 328.

The situation recognition processing corresponds to each processing of the sensor data processing unit 321 and the text data processing unit 324. The text data processing unit 324 extracts text data and a corresponding label in the failure handling case. Here, only text data will be described, and description of the sensor data will be omitted.

FIG. 18 is a diagram showing an example of the stock type information table. The stock type information is stored in the data management server 330, and is information in a text data format indicating a manual of each device to be maintained, a report of a failure handling case, and the like. As shown in FIG. 18, the stock type information table includes a content ID for identifying each stock type information.

FIG. 19 is a diagram showing an example of a raw label detection table. The text data processing unit 324 extracts the text data and a corresponding label in the failure handling case according to the above-described text analysis processing. Here, the raw label is a label including a character string extracted from the text data. As shown in FIG. 19, the raw label detection table includes a raw label detection ID for identifying a detection result, a raw label ID for identifying the detected raw label itself, and a detection group ID. The detection group ID is an ID for grouping when a character string to which a raw label in the same content ID is granted has association. FIG. 19 shows that a character string of the raw label ID "1" and a character string of the raw label ID "2" are associated with each other, and provided with a detection group ID "1", which means the same group included in the content ID "1".

FIG. 20 is a diagram showing an example of the raw label table. As shown in FIG. 20, the raw label table includes a raw label (extracted character string) corresponding to the raw label ID, and a label ID for identifying a unified label including the raw label. The unified label includes a raw label and a label whose notation has been converted into a predetermined notation.

FIG. 21 is a diagram showing an example of a label table. As shown in FIG. 21, the label table includes a key (KEY) ID for identifying a keyword (KEY) together with a label (character string of a unified label) corresponding to the label ID.

FIG. 22 is a diagram showing an example of a key table. As shown in FIG. 22, the key table has a keyword (KEY: character string) corresponding to the key (KEY) ID. The keywords are extracted through the text analysis processing of the text data processing unit 324.

FIG. 23 is a diagram showing an example of a mapping table. As described above, the episode storage unit 320 includes a function of the mapping processing unit 31 and generates a mapping table according to the mapping processing. As shown in FIG. 23, the mapping table includes a correlated label ID corresponding to the label ID and a mapping ID indicating the correlation strength of the correlated label ID. When the episode retrieval unit 317 is used to retrieve an episode corresponding to (similar to) the current situation (a failure situation that has occurred) from the episode DB 328, the episode retrieval unit 310 can recognize a failure handling case corresponding to the correlated label ID with reference to the mapping table.

[Modification]

FIG. 24 is a diagram showing a modification of the second embodiment.

As shown in FIG. 24, the present modification relates to a system including, as the concept of the information processing function of the system 300, a search knowledge processing unit 600, a retrieval knowledge processing unit 601, an information storage unit 602, an episode storage processing unit 603, and a knowledge processing unit 604.

As shown in FIG. 24, the episode storage processing unit 603 is a component corresponding to the episode storage unit 320, and generates and stores an episode composed of a set of events extracted from the information storage unit 602. As described above, an event is an element (event) representing a situation relating to each device to be maintained, and is information such as a keyword indicating a phenomenon or a location, or interpretation of sensor data.

The search knowledge processing unit 600 searches the episode storage processing unit 603 for similar past episodes, based on the current status of each device to be maintained. The current situation is information such as a phenomenon or a location indicating the failure situation that has occurred. The search knowledge processing unit 600 uses, as search knowledge, information on the order and priority of the grasp of situation and a measure of similarity to past episodes.

The retrieval knowledge processing unit 601 extracts and processes information, such as documents and sensor data stored in the information storage unit 602, based on the search knowledge from the search knowledge processing unit 600, and retrieves the information as an event. The episode storage processing unit 603 generates and stores an episode composed of a set of events retrieved by the retrieval knowledge processing unit 601.

The knowledge processing unit 604 uses the episodes stored by the episode storage processing unit 603 to acquire knowledge (knowledge creation information), such as a common causality relationship, as measures for facility maintenance. That is, the knowledge processing unit 604 uses the episode to acquire knowledge that can be used as a countermeasure against a situation other than the failure situation that has occurred. The knowledge processing unit 604 records the knowledge as data, such as a document, in the information storage unit 602.

In the system according to the present modification described above, the episode storage processing unit 603 executes the learning processing using the information including the knowledge acquired by the knowledge processing unit 604 as a result. Therefore, the episode storage processing unit 603 can continuously learn and store, as knowledge creation information, effective episodes including, for example, countermeasures against situations other than a failure situation that has occurred, for example, as measures for facility maintenance.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A service providing system which provides an information processing function as a service by using a network and a computer, the computer being configured to realize:

an information input unit that inputs stored first information on an analysis target and second information indicating a condition of the analysis target; a knowledge systematization processing unit that extracts keywords and a gist from first text information included in the first information, and generates first raw label information, second raw label information, and third raw label information, wherein the first raw label information comprises a label indicating a relationship between the keywords extracted from the first text information based on a result of a dependency analysis processing performed on the first text information, the second raw label information comprises a label indicating a type of the gist extracted from the first text information, and the third raw label information comprises a label indicating a causality relationship between texts based on a result of a causality relationship extraction processing performed on the first text information;

a condition identification processing unit that extracts keywords and a gist from second text information included in the second information, and generates fourth raw label information, fifth raw label information, and sixth raw label information, wherein the fourth raw label information comprises a label indicating a relationship between the keywords extracted from the second text information based on a result of a dependency analysis processing performed on the second text information, the fifth raw label information comprises a label indicating a type of the gist extracted from the second text information, and the sixth raw label information comprises a label indicating a causality relationship between texts based on a result of a causality relationship extraction processing performed on the second text information; and a presentation processing unit that acquires, from the first information, text information which corresponds to the first raw label information, the second raw label information, and the third raw label information and which is similar to a condition corresponding to the fourth raw label information, the fifth raw label information, and the sixth raw label information, the presentation processing unit presenting the acquired text information;

a mapping processing unit for generating a mapping information indicating a co-occurrence relation between the first raw label information, the second raw label information, and the third raw label information based on a result of a co-occurrence relation extraction processing performed on the first raw label information, the second raw label information, and the third raw label information, and wherein the presentation processing unit obtains the mapping information that indicates the co-occurrence relation between the first raw label information, the second raw label information, and the third raw label information and that is similar to the condition corresponding to the fourth raw label information, the fifth raw label information, and the sixth raw label information, the presentation processing unit acquiring text information corresponding to the obtained mapping information from the first information and presenting the acquired text information.

2. The service providing system according to claim 1, wherein the knowledge systematization processing unit:

stores, as a knowledge base, the first to third raw label information in which the respective labels are added to the first information on the analysis target;

executes expression unification processing for the first raw label information, and stores, as a knowledge base, label information whose expressions are unified through the expression unification processing.

3. The service providing system according to claim 2, wherein the computer is further configured to realize:

a condition identification unit for acquiring and storing associated label information by using the first to third raw label information and the fourth to sixth raw label information in which the respective labels are added to the second information indicating the condition of the analysis target.

4. The service providing system according to claim 3, wherein the knowledge presentation processing unit acquires a label ID of the associated label information, and acquires acquire information corresponding to knowledge from the knowledge base of the first to third raw label information by using the label ID of the associated label information.

5. A method which applies to a service providing system that provides an information processing function as a service by using a network and a computer, the system being configured to execute:

processing that acquires first information on an analysis target and second information indicating a condition of the analysis target;

processing that extracts keywords and a gist from first text information included in the first information, and generates first raw label information, second raw label information, and third raw label information, wherein the first raw label information comprises a label indicating a relationship between the keywords extracted from the first text information based on a result of a dependency analysis processing performed on the first text information, the second raw label information comprises a label indicating a type of the gist extracted from the first text information, and the third raw label information comprises a label indicating a causality relationship between texts based on a result of a causality relationship extraction processing performed on the first text information;

processing that extracts keywords and a gist from second text information included in the second information, and generates fourth raw label information, fifth raw label information, and sixth raw label information, wherein the fourth raw label information comprises a label indicating a relationship between the keywords extracted from the second text information based on a result of a dependency analysis processing performed on the second text information, the fifth raw label information comprises a label indicating a type of the gist extracted from the second text information, and the sixth raw label information comprises a label indicating a causality relationship between texts based on a result of a causality relationship extraction processing performed on the second text information; and processing that acquires, from the first information, text information which corresponds to the first raw label information, the second raw label information, and the third raw label information and which is similar to a condition corresponding to the fourth raw label information, the fifth raw label information, and the sixth raw label information, the presentation processing unit presenting the acquired text information;

a mapping processing unit for generating a mapping information indicating a co-occurrence relation between the first raw label information, the second raw label information, and the third raw label information based on a result of a co-occurrence relation extraction processing performed on the first raw label information, the second raw label information, and the third raw label information, and wherein the presentation processing unit obtains the mapping information that indicates the co-occurrence relation between the first raw label information, the second raw label information, and the third raw label information and that is similar to the condition corresponding to the fourth raw label information, the fifth raw label information, and the sixth raw label information, the presentation processing unit acquiring text information corresponding to the obtained mapping information from the first information and presenting the acquired text information.

* * * * *